United States Patent
Li et al.

(10) Patent No.: US 12,526,782 B2
(45) Date of Patent: Jan. 13, 2026

(54) BANDWIDTH PART SWITCHING METHOD AND APPARATUS

(71) Applicant: Huawei Technologies Co., Ltd., Shenzhen (CN)

(72) Inventors: Liangliang Li, Madrid (ES); Hongwei Wang, Shanghai (CN); Chaojun Li, Beijing (CN); Juan Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/298,546

(22) Filed: Apr. 11, 2023

(65) Prior Publication Data
US 2023/0247614 A1 Aug. 3, 2023

Related U.S. Application Data

(63) Continuation of application No. PCT/CN2020/120475, filed on Oct. 12, 2020.

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC .............. H04W 72/0453; H04W 72/23; H04B 2001/7154; H04B 1/7143; H04L 5/001; H04L 5/0012; H04L 5/0048
See application file for complete search history.

(56) References Cited

U.S. PATENT DOCUMENTS

| 11,979,918 | B2* | 5/2024 | Agiwal | H04W 74/0841 |
| 2018/0109286 | A1* | 4/2018 | Yao | H04W 4/70 |
| 2019/0098655 | A1* | 3/2019 | Shih | H04B 7/0695 |
| 2019/0364602 | A1* | 11/2019 | Yi | H04W 72/20 |
| 2021/0075579 | A1* | 3/2021 | Liu | H04L 5/0098 |

(Continued)

FOREIGN PATENT DOCUMENTS

| CN | 111436082 A | 7/2020 |
| EP | 3531566 A1 | 8/2019 |
| KR | 20190086043 A | 7/2019 |

(Continued)

OTHER PUBLICATIONS

Huawei, HiSilicon, Potential UE complexity reduction features, 3GPP TSG RAN WG1 Meeting #101-e, E-meeting, May 25-Jun. 5, 2020, R1-2003301, 8 pages.

(Continued)

*Primary Examiner* — Dady Chery
(74) *Attorney, Agent, or Firm* — Slater Matsil, LLP

(57) ABSTRACT

A terminal device receives a first BWP hopping pattern from a network device. The first BWP hopping pattern includes one or more pieces of configuration information for switching between a first BWP and a second BWP. The terminal device switches between the first BWP and the second BWP based on the first BWP hopping pattern. The switching between the first BWP and the second BWP includes switching from the first BWP to the second BWP and switching from the second BWP to the first BWP.

20 Claims, 10 Drawing Sheets

(56) References Cited

U.S. PATENT DOCUMENTS

2023/0090288 A1* 3/2023 Sakhnini ............... H04L 5/0012 370/329

FOREIGN PATENT DOCUMENTS

| WO | 2016164028 A1 | 10/2016 | | |
| WO | WO-2019083277 A1 * | 5/2019 | ............ | H04W 72/04 |

OTHER PUBLICATIONS

Huawei, HiSilicon, Functionality for coverage recovery, 3GPP TSG RAN WG1 Meeting #101-e, E-meeting, May 25-Jun. 5, 2020, R1-2003303, 6 pages.

3GPP TS 38.211 V16.3.0 (Sep. 2020), 3rd Generation Partnership Project; Technical Specification Group Radio Access Network; NR; Physical channels and modulation(Release 16), 133 pages.

3GPP TS 38.213 V16.1.0 (Mar. 2020), 3rd Generation Partnership Project; Technical Specification Group Radio Access Network; NR; Physical layer procedures for control(Release 16), 156 pages.

3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.

3GPP TS 38.300 V16.1.0 (Mar. 2020), 3rd Generation Partnership Project; Technical Specification Group Radio Access Network; NR; NR and NG-RAN Overall Description; Stage 2(Release 16), 133 pages.

3GPP TS 38.133 V16.3.0 (Mar. 2020), 3rd Generation Partnership Project; Technical Specification Group Radio Access Network; NR; Requirements for support of radio resource management(Release 16), 1169 pages.

* cited by examiner

BANDWIDTH PART SWITCHING METHOD AND APPARATUS

CROSS-REFERENCE TO RELATED APPLICATIONS

This application is a continuation of International Application No. PCT/CN2020/120475, filed on Oct. 12, 2020, the disclosure of which is hereby incorporated by reference in its entirety.

TECHNICAL FIELD

This application relates to the field of communication technologies, and in particular, to a bandwidth part (BWP) switching method and an apparatus.

BACKGROUND

In a 5th generation mobile network (5G) new radio (NR) communication technology, a system bandwidth of a 5G cell is far greater than a system bandwidth of a 4th generation mobile network (4G) cell. For example, a system bandwidth of a typical 2.6G/3.5G single-carrier cell in 5G is configured to 100 MHz. Considering the following several scenarios, the 3rd generation partnership project (3GPP) defines a concept of BWP, and one or more BWPs with different parameters may be configured for one terminal device. For a same terminal device, power consumption of the terminal device may be reduced by switching between BWPs of different bandwidths. In addition, BWPs of different sub-carrier spacings (SCS) may respectively carry enhanced mobile broadband (eMBB) and ultra-reliable and low latency communications (uRLLC) services, to ensure quality of service (QoS) requirements of different services.

According to a current NR protocol, although a plurality of BWPs may be configured for the terminal device, at a same moment, only one of the BWPs can be in an active state and used to receive and send data. In addition, if a plurality of BWPs are configured for the terminal device, switching between BWPs (the switching between BWPs is also referred to as "bandwidth adaptation (bandwidth adaptation)" in the NR protocol) needs to be based on a radio resource control (RRC) message, downlink control information (DCI) of a physical downlink control channel (PDCCH), or a timer. Generally, switching between dedicated BWPs needs to be based on DCI or an RRC message, switching between a default BWP and a dedicated BWP may be based on a timer, and switching between an initial BWP and a dedicated BWP needs to be based on an RRC message.

However, when the terminal device needs to switch between two BWPs for a plurality of times, RRC-based or DCI-based BWP switching has a long switch delay (for example, dozens of milliseconds to hundreds of milliseconds), affecting uplink and downlink rate performance of the terminal device. When a large quantity of users in a wireless communication network require BWP switching, because each BWP switching of each terminal device requires a network device to deliver an RRC message or DCI to the terminal device once, a large quantity of RRC messages or DCI is easily generated due to BWP switching requirements. Consequently, an RRC signaling storm occurs or negative impact is caused on a PDCCH channel capacity. Finally, network system performance is affected. Timer-based BWP switching is applicable only to unidirectional switching from a dedicated BWP to a default BWP. Switching from the default BWP back to the dedicated BWP still needs to be RRC-based BWP switching or DCI-based BWP switching. Therefore, such problems as a long switch delay, an RRC signaling storm, or negative impact on a PDCCH channel capacity also exist.

SUMMARY

Embodiments of this application provide a BWP switching method and an apparatus, to resolve problems of a large delay and large overheads in RRC-based BWP switching, DCI-based BWP switching, and timer-based BWP switching when a terminal device switches between two BWPs for a plurality of times.

To achieve the foregoing objective, the following technical solutions are used in the embodiments of this application:

According to a first aspect, a BWP switching method is provided. The method includes: A terminal device receives a first BWP hopping pattern from a network device. The first BWP hopping pattern includes one or more pieces of configuration information for switching between a first BWP and a second BWP. The terminal device switches between the first BWP and the second BWP based on the first BWP hopping pattern. The switching between the first BWP and the second BWP includes switching from the first BWP to the second BWP and switching from the second BWP to the first BWP.

Therefore, in this embodiment of this application, when the terminal device needs to switch between two BWPs for a plurality of times, the terminal device may independently switch between the BWPs based on configuration information configured by the network device. The network device side does not need to send an RRC message or a DCI message to indicate the terminal device to initiate BWP switching, and the terminal device does not need to perform BWP switching in a timer-based manner. This can avoid defects such as a large delay, large overheads (RRC message overheads, PDCCH overheads, and overheads for active data transmission scheduling), impact on rate performance of the terminal device, impact on network performance, and impact on service QoS that are caused by RRC-based BWP switching, DCI-based BWP switching, and timer-based BWP switching.

In a possible design, the switching between the first BWP and the second BWP includes periodically switching between the first BWP and the second BWP, that is, periodically switching from the first BWP to the second BWP and switching from the second BWP to the first BWP. Therefore, the terminal device can perform bidirectional switching based on the first BWP hopping pattern provided in this application, which not only can switch from the first BWP to the second BWP, but also can switch from the second BWP back to the first BWP. In addition, the first BWP hopping pattern may be used to switch between the BWPs for a plurality of times. In this way, with the first BWP hopping pattern configured, switching efficiency of the terminal device can be improved, and a switch delay can be reduced.

In a possible design, the switching between the first BWP and the second BWP based on the first BWP hopping pattern includes: determining a first time domain resource and a second time domain resource in a switching period based on the first BWP hopping pattern; switching from the first BWP to the second BWP on the first time domain resource; and switching from the second BWP to the first BWP on the second time domain resource. In this way, in one switching period, the terminal device may switch from the first BWP to the second BWP on the first time domain resource, use the second BWP as an active BWP on a time domain resource between the first time domain resource and the second time domain resource, and then switch from the second BWP to the first BWP on the second time domain resource. In this way, for the first BWP that cannot receive, for example, an SSB, a SIB, or a paging message, the terminal device may determine, based on the first BWP hopping pattern, a time domain resource for switching between the first BWP and the second BWP, to periodically switch to the second BWP to receive an SSB, a SIB, or a paging message, which does not need to receive signaling from the network device before BWP switching, thereby reducing signaling overheads and shortening a switch delay.

In a possible design, the configuration information includes at least one of the following: an identifier of the first BWP, an identifier of the second BWP, indication information of the switching period, and indication information of a third time domain resource in the switching period. The third time domain resource is a time domain resource of the second BWP. The switching period may be understood as a duration starting from a reference time (reference time). The reference time may be, for example, a start moment at which the first BWP hopping pattern is validated. The indication information of the third time domain resource may have a plurality of manners. For example, when the indication information of the third time domain resource indicates a start moment and an end moment of the third time domain resource after the first BWP hopping pattern is validated, the terminal device may determine a start moment of the first time domain resource (a moment of starting to switch from the first BWP to the second BWP) based on a switch delay and the start moment of the third time domain resource, and determine an end moment of the second time domain resource (an end moment of switching from the second BWP back to the first BWP) based on a switch delay and the end moment of the third time domain resource, so that the terminal device switches from the first BWP to the second BWP, uses the second BWP as an active BWP, and switches from the second BWP back to the first BWP based on the first time domain resource, the second time domain resource, and the third time domain resource. In this way, the terminal device performs BWP switching based on the plurality of pieces of configuration information, so that signaling overheads can be reduced, and a switch delay can be reduced.

In a possible design, an end moment of the first time domain resource is a start moment of the third time domain resource, and a start moment of the second time domain resource is an end moment of the third time domain resource. That is, after the terminal device completes switching from the first BWP to the second BWP on the first time domain resource, when the first time domain resource expires and the start moment of the third time domain resource arrives, the terminal device uses the second BWP as an active BWP. After completing receiving data on the third time domain resource, when the third time domain resource expires and the start moment of the second time domain resource arrives, the terminal device starts to switch from the second BWP to the first BWP. It may be understood that the time domain resources are consecutive, so that a switch delay can be shortened, and signaling does not need to be received, thereby reducing signaling overheads.

In a possible design, a length of the first time domain resource and a length of the second time domain resource are equal to a switch delay of switching between the first BWP and the second BWP, and the switch delay is predefined in the terminal device, or the configuration information further includes indication information of the switch delay. In other words, a duration of the first time domain resource occupied by the terminal device to switch from the first BWP to the second BWP is the same as a duration of the second time domain resource occupied by the terminal device to switch from the second BWP to the first BWP. The switch delay may be predetermined based on a capability of the terminal device, or may be determined by the network device based on a capability of the terminal device and a protocol. In this way, the terminal device may learn, based on the predefined or configured switch delay, a time domain resource for switching.

In a possible design, the method further includes: The terminal device sends a switch delay supported by the terminal device to the network device. The switch delay indicated by the configuration information is greater than or equal to the switch delay supported by the terminal device. The switch delay supported by the terminal device is related to a capability of the terminal device. When the network device determines the switch delay, the switch delay is greater than or equal to the switch delay supported by the terminal device, so that the terminal device can have sufficient time to complete switching in the switch delay, thereby improving a switching success rate. For example, the switch delay supported by the terminal device includes a minimum switch delay supported by the terminal device.

In a possible design, the method further includes: The terminal device performs radio resource management RRM or radio link monitoring RLM on the second BWP, or receives a broadcast message or a paging message on the second BWP. When a spectrum range of the first BWP does not include a time-frequency resource for performing RRM or RLM or receiving a broadcast message or a paging message, the terminal device may switch to the second BWP based on the first BWP hopping pattern configured for the first BWP, to perform RRM or RLM or receive a broadcast message or a paging message. In this way, for the first BWP that cannot perform RRM or RLM or receive a broadcast message, a SIB, or a paging message, the terminal device may periodically switch to the second BWP, so that the terminal device can perform BWP switching without receiving signaling, to perform RRM or RLM or receive a broadcast message or a paging message on the switched-to BWP, thereby reducing signaling overheads and shortening a switch delay.

In a possible design, the switching period is greater than or equal to a transmission period of a reference signal for RRM, a broadcast message, or a paging message. The transmission period may be understood as a period in which the network device actually sends a reference signal, a broadcast message, or a paging message. When the switching period is greater than or equal to the transmission period, it can be ensured that the terminal device can receive the reference signal, the broadcast message, or the paging message in a duration of the switching period, thereby improving a success rate of receiving the reference signal, the broadcast message, or the paging message. In a possible design, the method further includes: The terminal device sends an SSB receiving period supported by the terminal device, a SIB receiving period supported by the terminal device, or a paging message receiving period supported by the terminal device to the network device. The switching period is less than or equal to the SSB receiving period supported by the terminal device, the SIB receiving period supported by the terminal device, or the paging message receiving period supported by the terminal device. When the switching period is less than or equal to the SSB receiving period, the SIB receiving period, or the paging message receiving period, the terminal device can receive an SSB, a SIB, or a paging message in the switching period, thereby improving a success rate of receiving the SSB, the SIB, or the paging message.

In some embodiments, the switching period may be an integer multiple of a transmission period of the SSB, the SIB, or the paging message. This can ensure that the terminal device receives the SSB, the SIB, or the paging message in the switching period, thereby improving a success rate of receiving the SSB, the SIB, or the paging message.

In a possible design, the method further includes: The terminal device validates the BWP hopping pattern after activating the first BWP; or the terminal device receives validation indication information, the validation indication information indicates to validate the BWP hopping pattern, and the terminal device validates the BWP hopping pattern based on the validation indication information. It may be understood that the terminal device independently validates the BWP hopping pattern after activating the first BWP, or may receive a message such as RRC or DCI, where the message carries the validation indication information. In this way, after the first BWP hopping pattern is validated, the terminal device may not need to receive signaling before BWP switching, but can independently perform BWP switching based on the first BWP pattern, thereby reducing signaling overheads and shortening a switch delay.

In a possible design, the method further includes: The terminal device receives a second BWP hopping pattern. The second BWP hopping pattern indicates one or more pieces of configuration information for periodically switching between the first BWP and a third BWP. The terminal device periodically switches between the first BWP and the third BWP based on the second BWP hopping pattern. The first BWP may be understood as a source BWP, and the second BWP and the third BWP may be understood as two target BWPs. The second BWP may be, for example, used to receive an SSB, and the third BWP may be, for example, used to receive a SIB. In this way, a plurality of BWP hopping patterns may be configured for a same source BWP. Provided that the plurality of BWP hopping patterns do not conflict in time domain, the terminal device may independently switch between the first BWP and the second BWP, and switch between the first BWP and the third BWP, to reduce signaling overheads and shorten a switch delay.

In a possible design, the method may further include: When validating the first BWP hopping pattern, the network device validates the second BWP hopping pattern. Therefore, in addition to switching between the first BWP and the second BWP, the terminal device may further switch between the first BWP and the third BWP, thereby shortening a delay of switching between a plurality of BWPs by the terminal device.

In a possible design, the configuration information further includes offset time indication information, and the offset time indication information indicates an offset time of the end moment of the third time domain resource relative to a start moment of the switching period. When the start moment of the switching period is the reference time, a time from the reference time to the end moment of the third time domain resource is the offset time. The offset time and the switch delay can be used to determine an end moment of the second time domain resource, and the offset time and the start moment of the third time domain resource can be used to determine an end moment of the first time domain resource. The switch delay is predefined or configured. In this way, after a start moment and an end moment of each time domain resource in one switching period are determined, the terminal device can perform BWP switching based on the start moment and the end moment of each time domain resource.

According to a second aspect, a bandwidth part BWP switching method is provided. The method includes: A network device determines a first BWP hopping pattern. The first BWP hopping pattern includes one or more pieces of configuration information for switching between a first BWP and a second BWP. The network device sends the first BWP hopping pattern to a terminal device. The switching between the first BWP and the second BWP includes switching from the first BWP to the second BWP and switching from the second BWP to the first BWP. For beneficial effects of the second aspect, refer to the description of the first aspect.

In a possible design, the switching between the first BWP and the second BWP includes periodically switching between the first BWP and the second BWP.

In a possible design, the first BWP hopping pattern is used by the terminal device to determine a first time domain resource and a second time domain resource in a switching period. The first time domain resource is used to switch from the first BWP to the second BWP, and the second time domain resource is used to switch from the second BWP to the first BWP.

In a possible design, the configuration information includes at least one of the following: an identifier of the first BWP, an identifier of the second BWP, indication information of the switching period, and indication information of a third time domain resource in the switching period. The third time domain resource is a time domain resource of the second BWP.

In a possible design, an end moment of the first time domain resource is a start moment of the third time domain resource, and a start moment of the second time domain resource is an end moment of the third time domain resource.

In a possible design, a length of the first time domain resource and a length of the second time domain resource are equal to a switch delay of switching between the first BWP and the second BWP, and the switch delay is predefined in the network device, or the configuration information further includes indication information of the switch delay.

In a possible design, the method further includes: The network device receives a switch delay that is supported by the terminal device and that is sent by the terminal device. The switch delay indicated by the configuration information is greater than or equal to the switch delay supported by the terminal device.

In a possible design, the method further includes: The network device performs radio resource management RRM or radio link monitoring RLM on the second BWP, or receives a broadcast message or a paging message on the second BWP.

In a possible design, the switching period is greater than or equal to a transmission period of a reference signal for RRM, a broadcast message, or a paging message.

In a possible design, the method further includes: The network device receives an SSB receiving period supported and sent by the terminal device, a SIB receiving period supported and sent by the terminal device, or a paging message receiving period supported and sent by the terminal device. The switching period is less than or equal to the SSB receiving period supported by the terminal device, the SIB receiving period supported by the terminal device, or the paging message receiving period supported by the terminal device.

In a possible design, the method further includes: The network device sends validation indication information to the terminal device. The indication information indicates to validate the BWP hopping pattern.

In a possible design, the method further includes: The network device sends a second BWP hopping pattern to the terminal device. The second BWP hopping pattern indicates one or more pieces of configuration information for periodically switching between the first BWP and a third BWP.

In a possible design, when indicating the terminal device to validate the first BWP hopping pattern, the network device also indicates the terminal device to validate the second BWP hopping pattern. Therefore, in addition to switching between the first BWP and the second BWP, the terminal device may further switch between the first BWP and the third BWP, thereby shortening a delay of switching between a plurality of BWPs by the terminal device.

In a possible design, the configuration information further includes offset time indication information, and the offset time indication information indicates an offset time of the end moment of the third time domain resource relative to a start moment of the switching period. When the start moment of the switching period is a reference time, a time from the reference time to the end moment of the third time domain resource is the offset time. The offset time and the switch delay can be used to determine an end moment of the second time domain resource, and the offset time and the start moment of the third time domain resource can be used to determine an end moment of the first time domain resource. The switch delay is predefined or configured. In this way, after a start moment and an end moment of each time domain resource in one switching period are determined, the terminal device can perform BWP switching based on the start moment and the end moment of each time domain resource.

According to a third aspect, a terminal device is provided, including: a receiver, configured to receive a first BWP hopping pattern from a network device, where the first BWP hopping pattern includes one or more pieces of configuration information for switching between a first BWP and a second BWP; and a processor, configured to switch between the first BWP and the second BWP based on the first BWP hopping pattern. The switching between the first BWP and the second BWP includes switching from the first BWP to the second BWP and switching from the second BWP to the first BWP.

In a possible design, the processor is configured to: the switching between the first BWP and the second BWP includes periodically switching between the first BWP and the second BWP.

In a possible design, the processor is configured to: determine a first time domain resource and a second time domain resource in a switching period based on the first BWP hopping pattern; switch from the first BWP to the second BWP on the first time domain resource; and switch from the second BWP to the first BWP on the second time domain resource.

In a possible design, the plurality of pieces of configuration information include at least one of the following: an identifier of the first BWP, an identifier of the second BWP, indication information of the switching period, and indication information of a third time domain resource in the switching period. The third time domain resource is a time domain resource of the second BWP.

In a possible design, an end moment of the first time domain resource is a start moment of the third time domain resource, and a start moment of the second time domain resource is an end moment of the third time domain resource.

In a possible design, a length of the first time domain resource and a length of the second time domain resource are equal to a switch delay of switching between the first BWP and the second BWP, and the switch delay is predefined in the terminal device, or the plurality of pieces of configured time domain information further include indication information of the switch delay.

In a possible design, the transceiver is configured to send a switch delay supported by the terminal device to the network device. The switch delay indicated by the configuration information is greater than or equal to the switch delay supported by the terminal device.

In a possible design, the transceiver is further configured to perform radio resource management RRM or radio link monitoring RLM on the second BWP, or receive a broadcast message or a paging message on the second BWP.

In a possible design, the switching period is greater than or equal to a transmission period of a reference signal for RRM, a broadcast message, or a paging message.

In a possible design, the transceiver is further configured to send an SSB receiving period supported by the terminal device, a SIB receiving period supported by the terminal device, or a paging message receiving period supported by the terminal device to the network device. The switching period is less than or equal to the SSB receiving period supported by the terminal device, the SIB receiving period supported by the terminal device, or the paging message receiving period supported by the terminal device.

In a possible design, the processor is further configured to validate the BWP hopping pattern after activating the first BWP; or the transceiver is further configured to receive validation indication information indicating to validate the BWP hopping pattern, and the terminal device validates the BWP hopping pattern based on the validation indication information.

In a possible design, the transceiver is further configured to receive a second BWP hopping pattern. The second BWP hopping pattern indicates one or more pieces of configuration information for periodically switching between the first BWP and a third BWP. The processor is further configured to periodically switch between the first BWP and the third BWP based on the second BWP hopping pattern.

According to a fourth aspect, a network device is provided, including: a processor, configured to determine a first BWP hopping pattern, where the first BWP hopping pattern includes one or more pieces of configuration information for switching between a first BWP and a second BWP; and a transceiver, configured to send the first BWP hopping pattern to a terminal device. The switching between the first BWP and the second BWP includes switching from the first BWP to the second BWP and switching from the second BWP to the first BWP.

In a possible design, the switching between the first BWP and the second BWP includes periodically switching between the first BWP and the second BWP.

In a possible design, the first BWP hopping pattern is used by the terminal device to determine a first time domain resource and a second time domain resource in a switching period based on the first BWP hopping pattern. The first time domain resource is used to switch from the first BWP to the second BWP, and the second time domain resource is used to switch from the second BWP to the first BWP.

In a possible design, the configuration information includes at least one of the following: an identifier of the first BWP, an identifier of the second BWP, indication information of the switching period, and indication information of a third time domain resource in the switching period. The third time domain resource is a time domain resource of the second BWP.

In a possible design, an end moment of the first time domain resource is a start moment of the third time domain resource, and a start moment of the second time domain resource is an end moment of the third time domain resource.

In a possible design, a length of the first time domain resource and a length of the second time domain resource are equal to a switch delay of switching between the first BWP and the second BWP, and the switch delay is predefined in the network device, or the configuration information further includes indication information of the switch delay.

In a possible design, the transceiver is further configured to receive a switch delay that is supported by the terminal device and that is sent by the terminal device. The switch delay indicated by the configuration information is greater than or equal to the switch delay supported by the terminal device.

In a possible design, the transceiver is further configured to: perform radio resource management RRM or radio link monitoring RLM on the second BWP, or receive a broadcast message or a paging message on the second BWP.

In a possible design, the switching period is greater than or equal to a transmission period of a reference signal for RRM, a broadcast message, or a paging message.

In a possible design, the transceiver is further configured to receive an SSB receiving period supported and sent by the terminal device, a SIB receiving period supported and sent by the terminal device, or a paging message receiving period supported and sent by the terminal device. The switching period is less than or equal to the SSB receiving period supported by the terminal device, the SIB receiving period supported by the terminal device, or the paging message receiving period supported by the terminal device.

In a possible design, the transceiver is further configured to send validation indication information to the terminal device. The indication information indicates to validate the BWP hopping pattern.

In a possible design, the transceiver is further configured to send a second BWP hopping pattern to the terminal device. The second BWP hopping pattern indicates one or more pieces of configuration information for periodically switching between the first BWP and a third BWP.

According to a fifth aspect, a computer-readable storage medium is provided, including computer instructions. When the computer instructions are run on an electronic device, the electronic device is enabled to perform the method according to any one of the first aspect or the possible designs of the first aspect.

According to a sixth aspect, a computer-readable storage medium is provided, including computer instructions. When the computer instructions are run on an electronic device, the electronic device is enabled to perform the method according to any one of the second aspect or the possible designs of the second aspect.

According to a seventh aspect, a computer program product is provided. When the computer program product is run on a computer, an electronic device is enabled to perform the method according to any one of the first aspect or the possible designs of the first aspect.

According to an eighth aspect, a computer program product is provided. When the computer program product is run on a computer, an electronic device is enabled to perform the method according to any one of the second aspect or the possible designs of the second aspect.

According to a ninth aspect, a chip is provided. The chip includes a processor and an interface circuit, the interface circuit is coupled to the processor, the processor is configured to run a computer program or instructions, to implement the method according to any one of the first aspect or the possible designs of the first aspect, and the interface circuit is configured to communicate with a module other than the chip.

According to a tenth aspect, a chip is provided. The chip includes a processor and an interface circuit, the interface circuit is coupled to the processor, the processor is configured to run a computer program or instructions, to implement the method according to any one of the second aspect or the possible designs of the second aspect, and the interface circuit is configured to communicate with a module other than the chip.

According to an eleventh aspect, a communication system is provided. The communication system includes the terminal device according to any one of the third aspect or the possible designs of the third aspect and the network device according to any one of the fourth aspect or the possible designs of the fourth aspect.

According to a twelfth aspect, an apparatus is provided, including units configured to perform the method according to any one of the first aspect or the possible designs of the first aspect.

According to a thirteenth aspect, an apparatus is provided, including units configured to perform the method according to any one of the second aspect or the possible designs of the second aspect.

DETAILED DESCRIPTION OF ILLUSTRATIVE EMBODIMENTS

For ease of understanding, some concepts related to embodiments of this application are described for reference by using examples. Details are shown as follows:

BWP: It may be understood as a group of consecutive physical resource blocks (PRBs) in a carrier, or may be understood as an operating bandwidth of UE. A plurality of BWPs may be configured for one UE, but only one BWP can be active at a time. The UE may receive and send data on the active BWP. Different BWPs may use different SCSs or cyclic prefixes (CPs).

Figure 1:
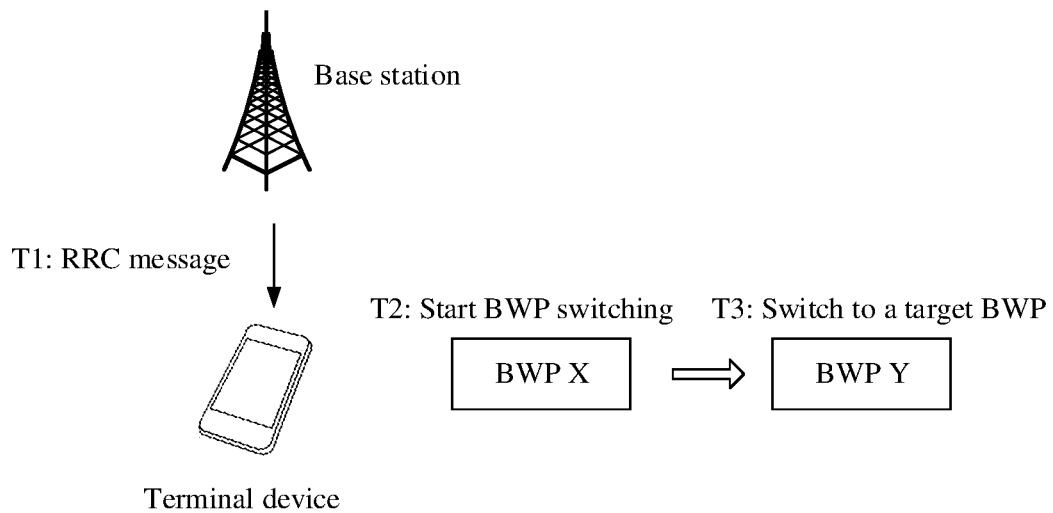
FIG. 1 is a schematic diagram of RRC-based BWP switching.

RRC-based BWP switching: As shown in FIG. 1, at a moment T1, a network device may send an RRC message to a terminal device. A related information element field carried in the RRC message may indicate the terminal device to switch from a current active BWP (for example, a BWP X) to a target BWP (for example, a BWP Y). At a moment T2, the terminal device starts BWP switching, to switch from the current active BWP (BWP X) to the target BWP (BWP Y). At a moment T3, the terminal device has switched to the target BWP, and uses the target BWP (BWP Y) as a current active BWP.

The source BWP (BWP X) may be a dedicated BWP, an initial BWP, or a default BWP, and the target BWP (BWP Y) may be a dedicated BWP, an initial BWP, or a default BWP.

Figure 2:
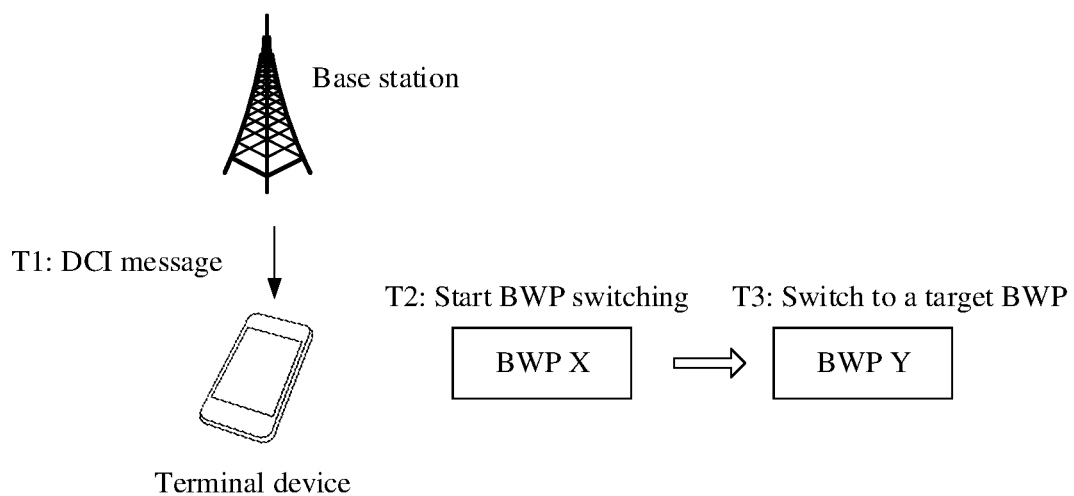
FIG. 2 is a schematic diagram of DCI-based BWP switching.

DCI-based BWP switching: As shown in FIG. 2, at a moment T1, a network device may send DCI to a terminal device. A related information element field in the DCI may indicate the terminal device to switch from a current active BWP (for example, a BWP X) to a target BWP (for example, a BWP Y). At a moment T2, the terminal device starts BWP switching, to switch from the current active BWP (BWP X) to the target BWP (BWP Y). At a moment T3, the terminal device has switched to the target BWP, and uses the target BWP (BWP Y) as a current active BWP.

The source BWP (BWP X) may be a dedicated BWP, an initial BWP, or a default BWP, and the target BWP (BWP Y) may be a dedicated BWP, an initial BWP, or a default BWP.

Figure 3:
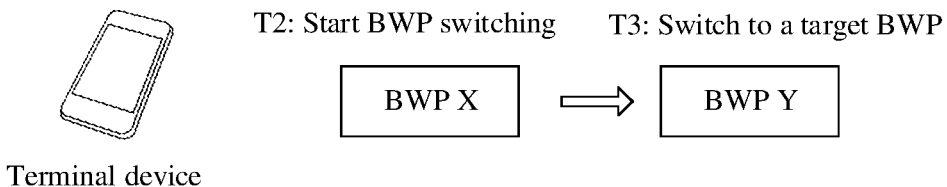
FIG. 3 is a schematic diagram of timer-based BWP switching.

Timer-based BWP switching: As shown in FIG. 3, at a moment T1, when a terminal device finds that a timer expires, the terminal device is triggered to perform BWP switching. The timer may be configured by a network device for the terminal device before the moment T1 via a system information block (system information block, SIB) or an RRC message. At a moment T2, the terminal starts BWP switching, to switch from a current active BWP (BWP X) to a target BWP (BWP Y). At a moment T3, the terminal device has switched to the target BWP, and uses the target BWP (BWP Y) as a current active BWP.

The source BWP (BWP X) may be a dedicated BWP, and the target BWP (BWP Y) may be a default BWP.

The following separately analyzes, in combination with a plurality of scenarios, BWP switching based on RRC messages, DCI-based BWP switching, and timer-based BWP switching.

For RRC-based BWP switching, when a terminal device needs to switch between two BWPs for a plurality of times, because a switch delay of RRC-based BWP switching is relatively long (for example, dozens of milliseconds to hundreds of milliseconds), when the terminal device carries a URLLC service with an ultra-reliable and low latency communication requirement, quality of service (QoS) of the URLLC service is prone to dissatisfaction, and the switch delay affects uplink and downlink rate performance of the terminal device. When a large quantity of users in a wireless communication network require BWP switching, because each BWP switching of each terminal device requires a network device to deliver an RRC message to the terminal device once, a large quantity of RRC messages are easily generated due to BWP switching requirements. Consequently, an RRC signaling storm occurs. Finally, network system performance is affected.

The following scenario 1 to scenario 3 are typical scenarios in which the terminal device switches between two BWPs for a plurality of times based on RRC messages, but the following scenarios are not exclusive.

Scenario 1: SSB-based radio resource management (RRM) and radio link management (RLM) measurement.

Figure 4:
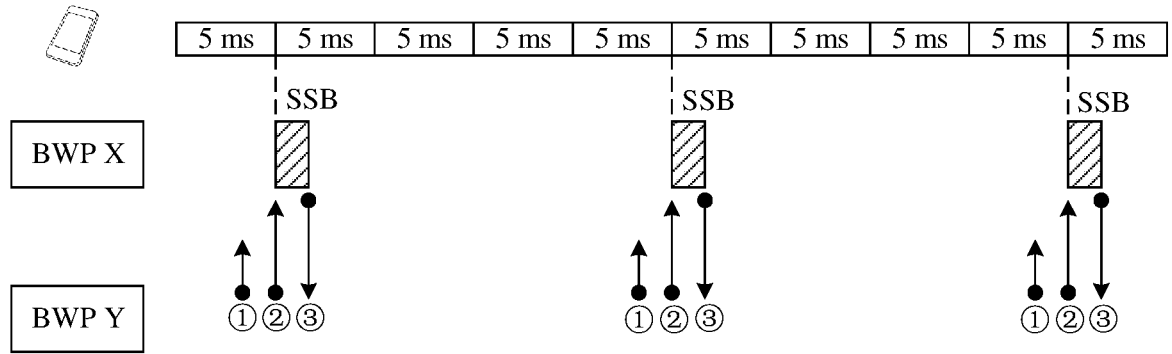
FIG. 4 is a schematic diagram of switching between a BWP X and a BWP Y.

For example, assuming that the BWP Y configured for the terminal device is a dedicated BWP, and a spectrum corresponding to the BWP Y is not used to transmit an SSB, when the BWP Y is used as an active BWP, the terminal device cannot perform SSB-based RRM or RLM measurement. Further, assuming that the BWP X is an initial BWP, a default BWP, or a dedicated BWP, and a spectrum corresponding to the BWP X may be used to transmit an SSB (that is, some or all resources of the spectrum of the BWP X are used to transmit the SSB), a procedure of switching between the BWP X and the BWP Y is shown in FIG. 4. With reference to FIG. 4, the switching procedure may include: (1) The terminal device receives and sends data on the current active BWP Y, and when the terminal device receives an RRC message and determines to measure an SSB on the BWP X, the terminal device starts BWP switching. (2) The terminal device completes BWP switching, that is, switches from the BWP Y to the BWP X, and starts to measure the SSB on the BWP X. (3) When the terminal device completes SSB measurement, the terminal device starts BWP switching, and switches from the BWP X back to the BWP Y. A unit time of 5 ms in FIG. 4 is an example.

Scenario 2: Obtain or update a SIB X, and obtain a paging message.

Figure 5:
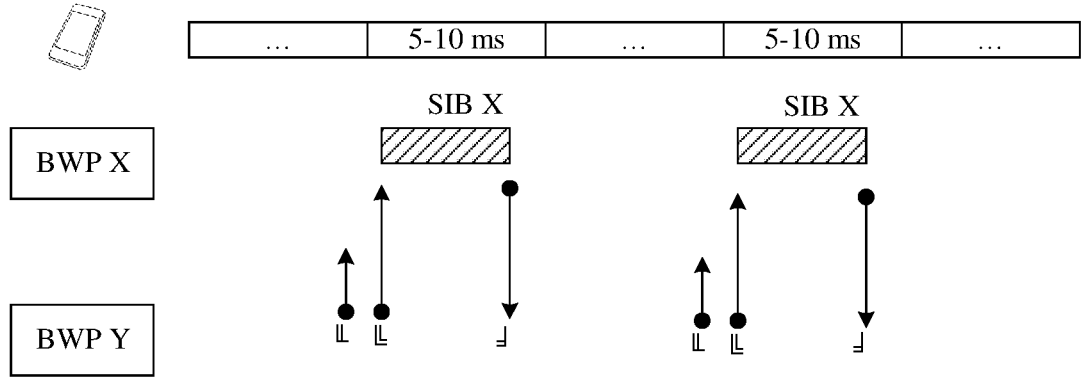
FIG. 5 is a schematic diagram of switching between a BWP X and a BWP Y.

For example, assuming that the BWP Y is a dedicated BWP, and a spectrum corresponding to the BWP Y is not used to transmit the SIB X (the SIB X may include a SIB1, a SIB2, a SIB3, a SIB4, a SIB5, a SIB6, a SIB7, a SIB 8, a SIB 9, and another SIB that may be added subsequently) or a spectrum corresponding to the BWP Y is not used to transmit a paging (paging) x, when the BWP Y is used as an active BWP, the terminal device cannot obtain or update the SIB X, and cannot receive a paging message. Further, assuming that the BWP X is an initial BWP, a default BWP, or a dedicated BWP, and a spectrum corresponding to the BWP X may be used to transmit the SIB X (it may be understood that, some or all resources of the spectrum of the BWP X are used to transmit the SIB X), using the SIB X as an example, a procedure of switching between the BWP X and the BWP Y by the terminal may be shown in FIG. 5. With reference to FIG. 5, the switching procedure may include: (1) The terminal device receives and sends data on the current active BWP Y, and when the SIB X needs to be obtained or updated (for example, when the terminal device receives an RRC message), the terminal device starts BWP switching. (2) The terminal device completes BWP switching, that is, switches from the BWP Y to the BWP X, and starts to receive the SIB X on the BWP X. (3) When the terminal device completes receiving the SIB X, the terminal device starts BWP switching, and switches from the BWP X back to the BWP Y. 5-10 ms in FIG. 5 is an example.

Scenario 3: Different BWPs carry services of different QoS.

Figure 6:
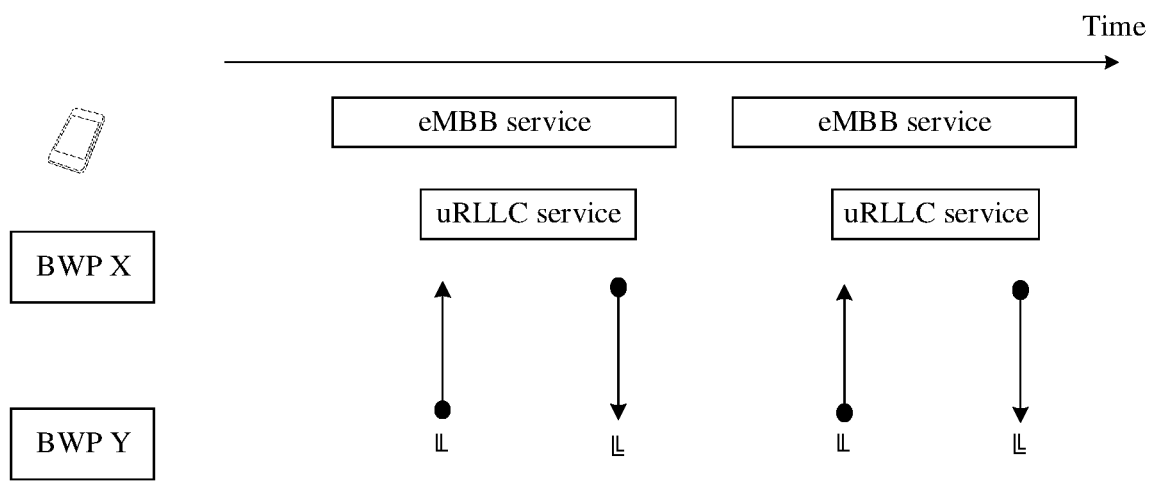
FIG. 6 is a schematic diagram of BWP switching when a terminal device allows for an eMBB service and a uRLLC service.

It is assumed that the BWP Y of the terminal device carries an eMBB service, and the BWP X carries a uRLLC service. Generally, the eMBB service has a lower requirement for a service delay indicator than the URLLC service. Therefore, because different BWPs carry different services, different SCSs need to be configured to meet QoS requirements of respective services. For example, an SCS of the eMBB service is usually configured to 15 kHz or 30 kHz, and an SCS of the URLLC service may be configured to 30 kHz or 60 kHz. It may be understood that a larger SCS indicates a shorter slot, so that a service may have a shorter air interface transmission delay. When the eMBB service and the uRLLC service of the terminal device arrive at the terminal device at different moments, to allow for QoS of the two different services, the terminal device needs to switch between BWPs, as shown in FIG. 6. A brief switching procedure may include: (1) The terminal device originally uses the BWP Y as an active BWP, and receives and sends data of the eMBB service. When the terminal device determines that the uRLLC service arrives, the terminal device starts BWP switching, and switches from the BWP Y to the BWP X. When the terminal device switches to the BWP X, the terminal device uses the BWP X as an active BWP, and receives and sends data of the uRLLC service. (2) When the terminal device completes receiving and sending the data of the uRLLC service, the terminal device starts BWP switching, and switches from the BWP X to the BWP Y, to continue to receive and send data of the eMBB service on the BWP Y.

For DCI-based BWP switching, when a terminal device needs to switch between two BWPs for a plurality of times, because a switch delay of DCI-based BWP switching is also long (an overall delay is 10 to dozens of milliseconds), when the terminal device carries a uRLLC service, QoS of the service is prone to dissatisfaction, and the switch delay affects uplink and downlink rate performance of the terminal device. When a large quantity of users in a wireless communication network require BWP switching, because each BWP switching of each terminal device requires a network device to deliver DCI to the terminal device once, a large quantity of DCI is easily generated due to BWP switching requirements. Consequently, negative impact is caused on a PDCCH capacity. Finally, network system performance is affected. In addition, as shown in FIG. 7, in a delay 3 after switching, a process of determining a state of the terminal device by active data transmission scheduling of the network device side easily causes a waste of spectrum resources.

Figure 7:
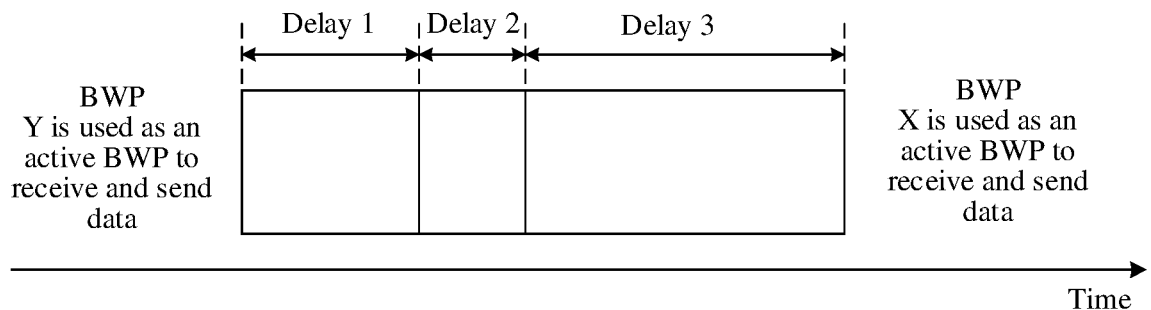
FIG. 7 is a schematic diagram of an overall delay in a BWP switching process performed by a terminal device.

For example, an overall delay of DCI-based BWP switching is shown in FIG. 7. With reference to FIG. 7, the overall delay of DCI-based BWP switching includes a delay 1, a delay 2, and a delay 3. Before the delay 1, the BWP Y is used as an active BWP to receive and send data. In the delay 1, when the terminal device receives DCI that indicates the terminal device to switch to the BWP X, to prevent an acknowledgment/negative acknowledgment (ACK/NACK) that needs to be fed back for received or sent data from falling into the delay 2, the terminal device needs to stop scheduling, receiving, and sending data in advance in the delay 1. The delay 2 may be understood as an active BWP switch delay defined in the NR protocol. In the delay 2, the terminal device cannot receive or send data. The terminal device performs BWP switching in the delay 2. In the delay 3, the network device needs to actively perform data transmission scheduling on the BWP X, to determine that the terminal device has been successfully switched to the BWP X, to avoid inconsistency between behaviors and statuses of the network device and the terminal device (the network device may send a PDCCH to indicate the terminal device to perform BWP switching, but the PDCCH is missed on the terminal device side, so that the terminal device does not initiate BWP switching or the switching fails). After the delay 3, the BWP X is used as a current active BWP to receive and send data.

Figure 8:
FIG. 8 is a schematic diagram of timer-based BWP switching.
Figure 8:
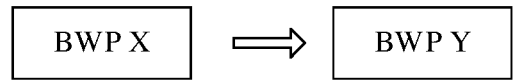
Figure 8:

For timer-based BWP switching, as shown in FIG. 8, using the solution shown in FIG. 3 as an example, the timer-based BWP switching is applicable only to unidirectional switching from a dedicated BWP to a default BWP. Switching from the default BWP back to the dedicated BWP still needs to be RRC-based BWP switching or DCI-based BWP switching. Therefore, the timer-based BWP switching has a same technical disadvantage as the RRC-based BWP switching and the DCI-based BWP switching.

In conclusion, when the terminal device needs to switch between two BWPs for a plurality of times, the three BWP switching mechanisms (RRC-based BWP switching, DCI-based BWP switching, and timer-based BWP switching) provided in the current NR protocol have disadvantages such as a large delay, large overheads (RRC message overheads, PDCCH overheads, and overheads for active data transmission scheduling), impact on rate performance of the terminal device, impact on network performance, and impact on service QoS. Technical solutions of this application may provide a BWP switching method with a low delay, low overheads, and little impact on network and user performance. When a terminal device needs to switch between two or more BWPs for a plurality of times, the method provided in this application can provide more efficient BWP switching, to reduce a delay, reduce signaling overheads, and improve performance of the terminal device and QoS.

Therefore, the BWP switching method provided in this application may be applied to a scenario in which a terminal device for which a plurality of BWPs are configured in an NR architecture switches between two BWPs.

Figure 9:
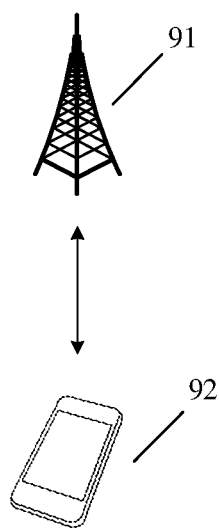
FIG. 9 is a schematic diagram of a network architecture according to an embodiment of this application.

As shown in FIG. 9, a communication system to which the method provided in this application is applied may include a network device 91 and a terminal device 92, and the network device 91 and the terminal device 92 may perform wireless communication.

The communication system provided in this application may be, for example, a long term evolution (LTE) system supporting a 4G access technology, a new radio (NR) system supporting a 5G access technology, any cellular system related to the 3rd generation partnership project (3GPP), a wireless-fidelity (Wi-Fi) system, a worldwide interoperability for microwave access (WiMAX) system, a multiple radio access technology (RAT) system, or another future-oriented communication technology.

The network device 91 in this embodiment of this application may be an access device that accesses the mobile communication system wirelessly. The access network device may be a device that is on an access network side and that is configured to support a terminal in accessing a communication system. The access network device may be referred to as a base station (BS), for example, an evolved NodeB (eNB) in a 4G access technology communication system, a next generation NodeB (gNB) in a 5G access technology communication system, a transmission reception point (TRP), a relay node, an access point (AP), an access node in a Wi-Fi system, a wireless backhaul node, or the like. The base station may be a macro base station, a micro base station, a picocell base station, a small cell, a relay station, or the like. A plurality of base stations may support networks using a same technology mentioned above, or may support networks using different technologies mentioned above. The base station may include one or more co-site or non-co-site transmission reception points (TRP). The access network device may alternatively be a radio controller, a central unit (CU), and/or a distributed unit (DU) in a cloud radio access network (CRAN) scenario. The access network device may alternatively be a server, a wearable device, a vehicle-mounted device, or the like. The following provides descriptions by using an example in which the access network device is a base station. A plurality of access network devices in the communication system may be base stations of a same type, or may be base stations of different types. The base station may communicate with the terminal, or may communicate with the terminal device by using a relay station. The terminal may communicate with a plurality of base stations using different technologies. For example, the terminal may communicate with a base station supporting an LTE network, or may communicate with a base station supporting a 5G network, or may support dual connections to a base station in an LTE network and a base station in a 5G network.

A specific technology and a specific device form that are used for the access network device are not limited in this embodiment of this application.

The terminal device 92 in this application is a device having a wireless transceiver function, and may be deployed on land, including indoor, outdoor, handheld, wearable, or vehicle-mounted, may be deployed on a water surface (for example, on a ship), or may be deployed in the air (for example, on an unmanned aerial vehicle, an airplane, a balloon, or a satellite). The terminal device may be referred to as a terminal. The terminal may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in this embodiment of this application. The terminal may sometimes also be referred to as a terminal device, user equipment (UE), an access terminal device, a station, a UE unit, a UE station, a mobile station, a mobile, a remote station, a remote terminal device, a mobile device, a UE terminal device, a wireless communication device, a UE agent, a UE apparatus, or another appropriate term. The terminal may be fixed or movable. The network device 91 and the terminal device 92 may be deployed on land, including indoor, outdoor, handheld, or vehicle-mounted, or may be deployed on a water surface, or may be deployed on an airplane, an unmanned aerial vehicle, a balloon, or a satellite in the air. Application scenarios of the radio access network device and the terminal device are not limited in this embodiment of this application.

It is to be noted that the terminal device in this application may be a REDCAP terminal in an NR system. The REDCAP terminal may also be referred to as a low-capability terminal device, a reduced-capability terminal device, REDCAP UE, reduced-capacity UE, massive machine type communications (mMTC) UE, or the like. The REDCAP terminal may be different from other legacy terminal devices. The legacy terminal device may be a conventional-capability or normal-capability high-capability terminal device, and may also be referred to as legacy UE.

For example, a difference between the REDCAP terminal and the legacy terminal device may include at least one of the following:

(1) Different bandwidth capabilities: For example, a carrier bandwidth of the REDCAP terminal is not greater than 50 MHz, for example, is at least one of 50 MHz, 40 MHz, 20 MHz, 15 MHz, 10 MHz, or 5 MHz. A carrier bandwidth of the legacy terminal device is greater than 50 MHz.

(2) Different quantities of transmit and receive antennas: For example, the REDCAP terminal may support 2 receive 1 transmit (two receive antennas and one transmit antenna) or 1 receive 1 transmit (one receive antenna and one transmit antenna). The legacy terminal device may support 4 receive 2 transmit (four receive antennas and two transmit antennas). It may be understood that, when a same data transmission rate is implemented, because quantities of transmit and receive antennas of the REDCAP terminal are less than quantities of transmit and receive antennas of the legacy terminal device, a maximum coverage area that can be implemented for data transmission between the REDCAP terminal and a base station is less than a maximum coverage area that can be implemented for data transmission between the legacy terminal device and a base station.

(3) Different maximum uplink transmit power: For example, maximum uplink transmit power of the REDCAP terminal may be a value in 4 decibel-milliwatts (dBm) to 20 dBm. Maximum uplink transmit power of the legacy terminal device may be 23 dBm or 26 dBm.

(4) Different protocol releases: The REDCAP terminal may be a terminal device in NR release-17 (release-17, Rel-17) or a release later than NR Rel-17. The legacy terminal device may be, for example, a terminal device in NR release-15 (Rel-15) or NR release-16 (Rel-16). The legacy terminal device may also be referred to as an NR legacy terminal device.

(5) Different carrier aggregation capabilities: For example, the REDCAP terminal does not support carrier aggregation, and the legacy terminal device may support carrier aggregation. For another example, both the REDCAP terminal and the legacy terminal device may support carrier aggregation, but a maximum quantity of carriers that can be aggregated by the REDCAP terminal is less than a maximum quantity of carriers that can be aggregated by the legacy terminal device. For example, the REDCAP terminal supports aggregation of a maximum of two carriers, and the legacy terminal device may support aggregation of a maximum of five carriers or 32 carriers.

(6) Different duplex capabilities: For example, the RED-CAP terminal supports half-duplex frequency division duplex (FDD). The legacy terminal device supports full-duplex FDD.

(7) Different data processing time capabilities: For example, a minimum delay between receiving downlink data and sending a feedback on the downlink data by the REDCAP terminal is greater than a minimum delay between receiving downlink data and sending a feedback on the downlink data by the legacy terminal device, and/or a minimum delay between sending uplink data and receiving a feedback on the uplink data by the REDCAP terminal is greater than a minimum delay between sending uplink data and receiving a feedback on the uplink data by the legacy terminal device.

(8) Different processing capabilities (ability/capability): For example, a baseband processing capability of the REDCAP terminal is lower than a baseband processing capability of the legacy terminal device. The baseband processing capability may include at least one of the following: a maximum quantity of multiple-input multiple-output (MIMO) layers supported by the terminal device during data transmission, a quantity of hybrid automatic repeat request (HARQ) processes supported by the terminal device, and a maximum transport block size (TBS) supported by the terminal device.

(9) Different uplink and/or downlink peak transmission rates: The peak transmission rate is a maximum data transmission rate that can be reached by the terminal device in a unit time (for example, per second). An uplink peak rate supported by the REDCAP terminal may be lower than an uplink peak rate supported by the legacy terminal device, and/or a downlink peak rate supported by the REDCAP terminal may be lower than a downlink peak rate supported by the legacy terminal device. For example, the REDCAP terminal has an uplink peak rate less than or equal to 50 Mbit/s, and a downlink peak rate less than or equal to 150 Mbit/s, and the legacy terminal device has an uplink peak rate greater than or equal to 50 Mbit/s, and a downlink peak rate greater than or equal to 150 Mbit/s. For another example, the uplink peak rate or the downlink peak rate of the REDCAP terminal is at a level of hundreds of Mbit/s, and the uplink peak rate or the downlink peak rate of the legacy terminal device is at a level of Gbit/s.

(10) Different buffer sizes: The buffer may be understood as a total size of a layer 2 (L2) buffer, and is defined as a sum of a quantity of bytes buffered in a radio link control (RLC) transmit window, receive window, and reordering window and a quantity of bytes buffered in a packet data convergence protocol (PDCP) reordering window by the terminal device for all radio bearers. Alternatively, the buffer may be understood as a total quantity of soft channel bits that can be used for HARQ processing.

Certainly, the foregoing is merely examples, and there may be another difference between the REDCAP terminal device and the legacy terminal device. Examples are not described one by one herein.

With the foregoing network architecture, in the BWP switching method in this application, a BWP hopping pattern is proposed. The BWP hopping pattern may be understood as a hopping pattern for switching between BWPs by the terminal device. The network device may configure a BWP hopping pattern for the terminal device, and the terminal device may switch between BWPs based on the BWP hopping pattern. The BWP hopping pattern may include one or more pieces of configuration information for switching between BWPs. In this way, after the network device indicates the terminal device to validate and activate the BWP hopping pattern, the terminal device may actively initiate and complete BWP switching between a plurality of BWPs periodically based on the configuration information in the BWP hopping pattern. The network device side does not need to further deliver an RRC message or a DCI message to indicate the terminal device to initiate BWP switching, and the terminal device does not need to perform BWP switching in a timer-based manner. This can avoid defects such as a large delay, large overheads (RRC message overheads, PDCCH overheads, and overheads for active data transmission scheduling), impact on rate performance of the terminal device, impact on network performance, and impact on service QoS that are caused by RRC-based BWP switching, DCI-based BWP switching, and timer-based BWP switching.

The following describes embodiments of this application.

Figure 10:
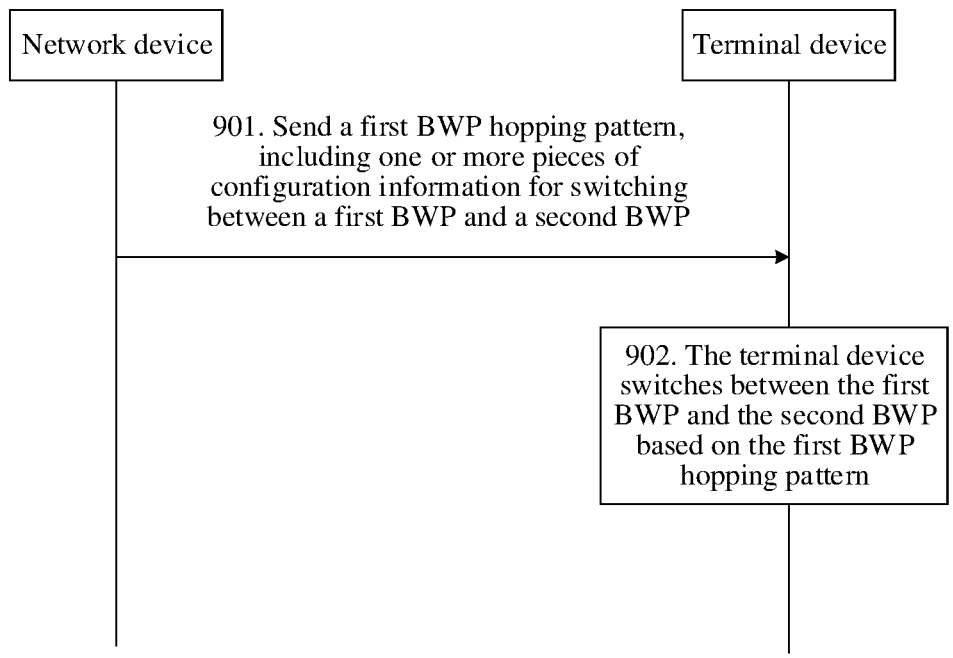
FIG. 10 is a signaling interaction diagram of a BWP switching method according to an embodiment of this application.

As shown in FIG. 10, an embodiment of this application provides a BWP switching method. The method may include the following steps.

901. A network device sends a first BWP hopping pattern to a terminal device. The first BWP hopping pattern includes one or more pieces of configuration information for switching between a first BWP and a second BWP.

Correspondingly, the terminal device receives the first BWP hopping pattern from the network device.

902. The terminal device switches between the first BWP and the second BWP based on the first BWP hopping pattern.

The first BWP hopping pattern may be understood as the foregoing BWP hopping pattern. It may be understood that "first" in the "first BWP hopping pattern" is used only to distinguish from another BWP hopping pattern below. The first BWP hopping pattern may have another name. This is not limited in this implementation of this application.

Optionally, the first BWP may be a dedicated BWP, a default BWP, or an initial BWP, and the second BWP may be a dedicated BWP, a default BWP, or an initial BWP. In some embodiments, the network device may send the BWP hopping pattern to the terminal device by using an RRC message. Each RRC message carries one BWP hopping pattern. For example, in this application, the first BWP hopping pattern may be carried in the first RRC message. When the network device needs to update the first BWP hopping pattern, the network device may further send a second RRC message to the terminal device. The second RRC message carries an updated BWP hopping pattern.

Alternatively, the network device may send a plurality of BWP hopping patterns to the terminal device by using one RRC message, and then the network device may indicate, by using first DCI, the terminal to use the first BWP hopping pattern in the plurality of BWP hopping patterns.

The switching between the first BWP and the second BWP includes switching from the first BWP to the second BWP and switching from the second BWP to the first BWP. It may be understood that, with the first BWP hopping pattern, the terminal device may switch from the first BWP to the second BWP, and switch from the second BWP to the first BWP, and the network device does not need to deliver an RRC message or DCI for each BWP switching, so that a delay can be reduced, and air interface signaling overheads can be reduced. In some embodiments, the switching between the first BWP and the second BWP includes periodically switching between the first BWP and the second BWP. That is, the terminal device may switch from the first BWP to the second BWP based on the first BWP hopping pattern. After using the second BWP as an active BWP, the terminal device may further switch from the second BWP back to the first BWP based on the first BWP hopping pattern. Then again, the terminal device may switch from the first BWP to the second BWP based on the first BWP hopping pattern, and switch from the second BWP back to the first BWP based on the first BWP hopping pattern. It may be understood that, based on the first BWP hopping pattern, the terminal device may repeat switching between the first BWP and the second BWP. Details are not described again in this embodiment of this application.

Figure 11:
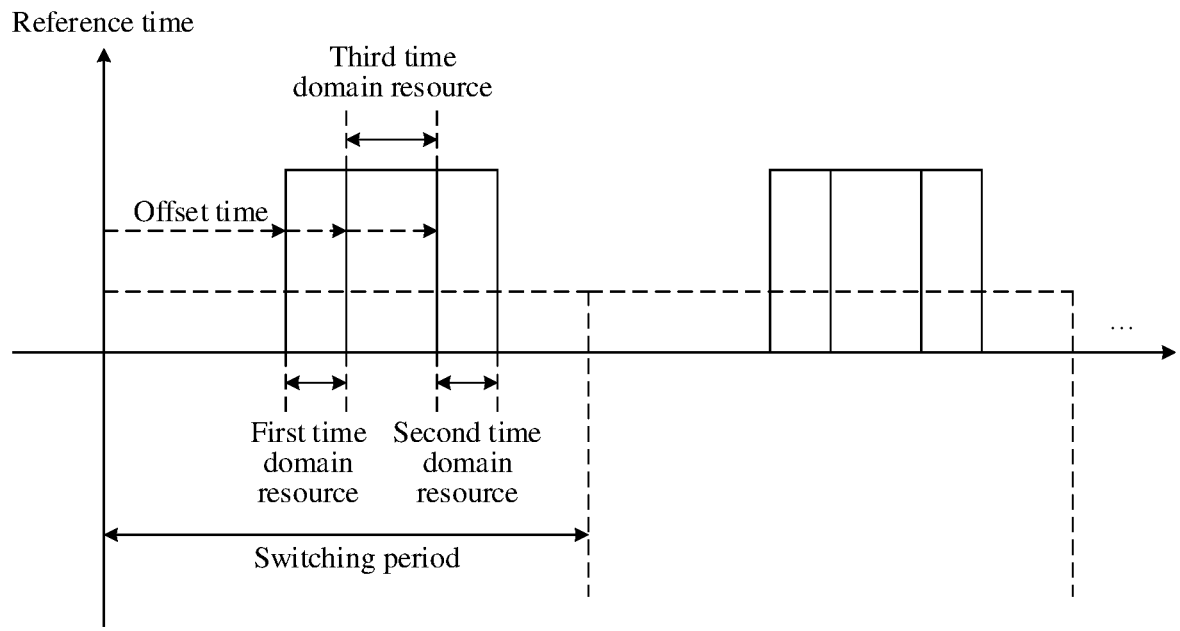
FIG. 11 is a schematic diagram of information in configuration information on a timeline according to an embodiment of this application.

With reference to FIG. 11, based on the one or more pieces of configuration information in the first BWP hopping pattern, the terminal device may switch from the first BWP to the second BWP on a first time domain resource, the terminal device may switch from the second BWP to the first BWP on a second time domain resource, and the terminal device may work on the second BWP on a third time domain resource. It can be learned from FIG. 11 that an end moment of the first time domain resource is a start moment of the third time domain resource, and an end moment of the third time domain resource is a start moment of the second time domain resource. In some embodiments, in Manner 1:

The one or more pieces of configuration information included in the BWP hopping pattern may be used to indicate time domain resources on which the terminal device works on the two BWPs in one switching period. Then, the terminal device may determine, based on the switching period and the time domain resources on which the terminal device works on the two BWPs in one switching period, time domain resources on which the terminal device switches between the two BWPs in one switching period.

In the manner 1, with reference to FIG. 11, the configuration information may include at least one of the following: an identifier of the first BWP, an identifier of the second BWP, indication information of a switching period, and indication information of a third time domain resource in the switching period. The third time domain resource is a time domain resource of the second BWP. The time domain resource of the second BWP may be understood as a time domain resource on which the second BWP works or is active.

In some embodiments, based on the foregoing description of the configuration information in Manner 1:

The switching period may be understood as a period in which the terminal device switches between the two BWPs. In some embodiments, the one or more pieces of configuration information may include the switching period, or the one or more pieces of configuration information may not include the switching period, and the network device may separately configure the switching period for the terminal device.

With reference to FIG. 11, the indication information of the switching period may indicate a time length, and the time length represents a duration starting from a reference time (reference time). The reference time may be a start moment at which the first BWP hopping pattern is validated, and the start moment at which the first BWP hopping pattern is validated may be a moment indicated by the network device. For example, the start moment may be represented by one or more of a system frame number (SFN), a slot number, and an orthogonal frequency division multiplexing (OFDM) symbol. For example, the start moment may be an OFDM symbol 0 in a slot 0 of a system frame with SFN=0, or the start moment may be another value. Alternatively, the reference time may be a moment agreed on by a system by default. For example, the reference time may be separated by several OFDM symbols from a moment at which the first BWP hopping pattern starts to be validated. The several OFDM symbols are agreed on by the network device and the terminal device by default. After several OFDM symbols starting from the reference time, the first BWP hopping pattern is validated, and the terminal device starts to perform BWP switching based on the first BWP hopping pattern.

The indication information of the third time domain resource may indicate a start moment and an end moment of the third time domain resource in one switching period. The terminal device may determine, based on the start moment and the end moment of the third time domain resource, a time period in which the switched-to second BWP is used as an active BWP.

Alternatively, the indication information of the third time domain resource may indicate a start moment that is relative to the reference time and at which the terminal device starts to switch from the second BWP to the first BWP.

Alternatively, the indication information of the third time domain resource may indicate a time length, and the time length is a duration in which the terminal device uses the switched-to second BWP as an active BWP.

If the indication information of the third time domain resource indicates the start moment (the start moment of the second time domain resource below) of switching from the second BWP to the first BWP, the configuration information may further include offset time indication information. The offset time indication information may indicate a duration from the reference time to a moment (the start moment of the first time domain resource below) of starting to switch from the first BWP to the second BWP, or indicate a duration from the reference time to the start moment of the third time domain resource.

If the indication information of the third time domain resource indicates the duration in which the switched-to second BWP is used as an active BWP, the configuration information may further include offset time indication information. The offset time indication information may indicate a duration from the reference time to a moment of starting to switch from the first BWP to the second BWP (the start moment of the first time domain resource below), or indicate a duration from the reference time to the start moment of the third time domain resource, or indicate a duration from the reference time to an end moment of the third time domain resource.

Based on the description of the configuration information in Manner 1, the switching between the first BWP and the second BWP based on the first BWP hopping pattern may include: The terminal device determines a first time domain resource and a second time domain resource in the switching period based on the first BWP hopping pattern. In some embodiments, the terminal device may first determine the switching period based on the indication information of the switching period in the configuration information, and then determine the first time domain resource and the second time domain resource based on the indication information of the switching period and the indication information of the third time domain information.

For example, when the indication information of the switching period indicates the time length starting from the reference time, the terminal device may determine, based on the reference time, the moment at which the first BWP hopping pattern is validated, and determine the duration of the switching period based on the time length.

When the indication information of the third time domain resource indicates a start moment and an end moment of a third time domain resource in the first switching period after the first BWP hopping pattern is validated, the terminal device may determine, based on the start moment of the third time domain resource and a length indicated by indication information of a switch delay (which may be predefined in the terminal device, or may be carried in the configuration information), a start moment of a first time domain resource (the start moment of the third time domain resource—the length indicated by the indication information of the switch delay). An end moment of the first time domain resource is the start moment of the third time domain resource. In addition, the terminal device may determine an end moment of a second time domain resource based on the end moment of the third time domain resource and the length indicated by the indication information of the switch delay. The end moment of the third time domain resource is a start moment of the second time domain resource. Then, the terminal device may determine a start moment and an end moment of each time domain resource in a next switching period and a subsequent switching period based on the duration of the switching period, the start moment and the end moment of the first time domain resource, the start moment and the end moment of the second time domain resource, and the start moment and the end moment of the third time domain resource.

When the indication information of the third time domain resource indicates the start moment of the second time domain resource, and the offset time indication information indicates the duration from the reference time to the start moment of the first time domain resource, the terminal device may determine the start moment of the first time domain resource based on the reference time and the offset time, and determine the end moment of the first time domain resource based on the start moment of the first time domain resource and the switch delay. The end moment of the first time domain resource is the start moment of the third time domain resource, and the start moment of the second time domain resource is the end moment of the third time domain resource. In addition, the terminal device determines the end moment of the second time domain resource based on the start moment of the second time domain resource and the switch delay. Then, the terminal device may determine a start moment and an end moment of each time domain resource in a next switching period and a subsequent switching period based on the duration of the switching period, the start moment and the end moment of the first time domain resource, the start moment and the end moment of the second time domain resource, and the start moment and the end moment of the third time domain resource.

When the indication information of the third time domain resource indicates a time length, and the offset time indication information indicates the duration starting from the reference time to the start moment of the first time domain resource, the terminal device may determine the start moment of the first time domain resource based on the reference time and the offset time, and determine the end moment of the first time domain resource based on the start moment of the first time domain resource and the switch delay. The end moment of the first time domain resource is the start moment of the third time domain resource. The terminal device determines the end moment of the third time domain resource based on the start moment of the third time domain resource and the time length of the third time domain resource. The end moment of the third time domain resource is the start moment of the second time domain resource. The terminal device determines the end moment of the second time domain resource based on the start moment of the second time domain resource and the switch delay. Then, the terminal device may determine a start moment and an end moment of each time domain resource in a next switching period and a subsequent switching period based on the duration of the switching period, the start moment and the end moment of the first time domain resource, the start moment and the end moment of the second time domain resource, and the start moment and the end moment of the third time domain resource.

Alternatively, in a possible implementation 2:

The one or more pieces of configuration information included in the BWP hopping pattern may be used to indicate time domain resources on which the terminal device switches between the two BWPs in one switching period (including a time domain resource occupied for switching from the first BWP to the second BWP and a time domain resource occupied for switching from the second BWP to the first BWP). Then, the terminal device may further determine, based on the switching period and the time domain resources on which the terminal device switches between the two BWPs, time domain resources on which the terminal device works on the two BWPs in one switching period (including a time domain resource on which the terminal device works on the first BWP and a time domain resource on which the terminal device works on the second BWP).

In Manner 2, with reference to FIG. 11, the configuration information may include at least one of the following: an identifier of the first BWP, an identifier of the second BWP, indication information of a switching period, indication information of a first time domain resource in the switching period, and indication information of a second time domain resource in the switching period. The first time domain resource is a time domain resource for switching from the first BWP to the second BWP, and the second time domain resource is a time domain resource for switching from the second BWP to the first BWP.

In some embodiments, based on the foregoing description of the configuration information in Manner 2:

An implementation of the switching period in Manner 2 is similar to the description of the switching period in Manner 1, and details are not described herein again.

The indication information of the first time domain resource may indicate a start moment or an end moment of the first time domain resource, and the indication information of the second time domain resource may indicate a start moment or an end moment of the second time domain resource.

Alternatively, the indication information of the first time domain resource indicates an offset time of the first time domain resource relative to the reference time, and the start moment or the end moment indicated by the indication information of the second time domain resource may also be an offset time relative to the reference time.

In some embodiments, based on the description of the configuration information in Manner 2, the switching between the first BWP and the second BWP based on the first BWP hopping pattern may include: The terminal device determines a third time domain resource in the switching period based on the first BWP hopping pattern, and uses the second BWP as an active BWP on the third time domain resource.

In some embodiments, the terminal device may first determine the switching period based on the indication information of the switching period in the configuration information, and then determine the third time domain resource based on the indication information of the switching period, the indication information of the first time domain resource, and the indication information of the second time domain resource.

For example, when the indication information of the switching period indicates a time length starting from the reference time, the terminal device may determine, based on the reference time, a moment at which the first BWP hopping pattern is validated, and determine a duration of the switching period based on the time length.

In a possible implementation, when the indication information of the first time domain resource indicates the start moment of the first time domain resource, and the indication information of the second time domain resource indicates the start moment of the second time domain resource, the terminal device may determine the end moment of the first time domain resource based on the start moment of the first time domain resource and the time length of the switch delay. In this way, a duration between the end moment of the first time domain resource and the start moment of the second time domain resource is the third time domain resource, the end moment of the first time domain resource is a start moment of the third time domain resource, and the start moment of the second time domain resource is an end moment of the third time domain resource.

In another possible implementation, when the indication information of the first time domain resource indicates the end moment of the first time domain resource, and the indication information of the second time domain resource indicates the start moment of the second time domain resource, a duration between the end moment of the first time domain resource and the start moment of the second time domain resource is a duration of the third time domain resource. The terminal device may further determine the start moment of the first time domain resource based on the end moment of the first time domain resource and the switch delay, and determine the end moment of the second time domain resource based on the start moment of the second time domain resource and the switch delay.

In still another possible implementation, when the indication information of the first time domain resource indicates the start moment of the first time domain resource, and the indication information of the second time domain resource indicates the end moment of the second time domain resource, the terminal device may determine the end moment of the first time domain resource based on the start moment of the first time domain resource and the switch delay, and determine the start moment of the second time domain resource based on the end moment of the second time domain resource and the switch delay. In this way, a duration between the end moment of the first time domain resource and the start moment of the second time domain resource is a duration of the third time domain resource.

In still another possible implementation, when the indication information of the first time domain resource indicates the end moment of the first time domain resource, and the indication information of the second time domain resource indicates the end moment of the second time domain resource, the terminal device may determine the start moment of the second time domain resource based on the end moment of the second time domain resource and the switch delay. A duration between the end moment of the first time domain resource and the start moment of the second time domain resource is a duration of the third time domain resource. In addition, the terminal device may further determine the start moment of the first time domain resource based on the end moment of the first time domain resource and the switch delay.

After determining the start moments and the end moments of the first time domain resource, the second time domain resource, and the third time domain resource in the switching period, the terminal device may switch from the first BWP to the second BWP in a duration between the start moment and the end moment of the first time domain resource, use the second BWP as an active BWP in a duration between the start moment and the end moment of the third time domain resource, and switch from the second BWP to the first BWP in a duration between the start moment and the end moment of the second time domain resource.

Alternatively, in a possible implementation 3:

A predefined table may be configured on both the terminal device and the network device. Each row in the table corresponds to one BWP hopping pattern, and each row corresponds to one index. In some embodiments, the BWP hopping pattern in each row in the table may include one or more pieces of configuration information in Manner 1 or Manner 2. When the network device needs to configure a BWP hopping pattern to be used by the terminal device, the network device may indicate, to the terminal device, an index corresponding to the BWP hopping pattern. When receiving the index, the terminal device may determine, based on the received index and the predefined table, the BWP hopping pattern currently configured by the network device. In this way, the network device side needs to indicate only the index corresponding to the BWP hopping pattern, so that air interface resources on the network device side and the terminal device side can be saved.

It may be understood that the one or more pieces of configuration information carried in the first BWP hopping pattern may be implemented in a plurality of manners. The following uses an implementation of the first BWP hopping pattern as an example for description. Key information of the first BWP hopping pattern may include a period, a duration, an offset, and an active BWP switch delay.

The period may be understood as the switching period, the duration may be understood as the third time domain resource, the offset may be understood as the offset time, and the active BWP switch delay may be understood as the switch delay. The first time domain resource or the second time domain resource is occupied.

Figure 12:
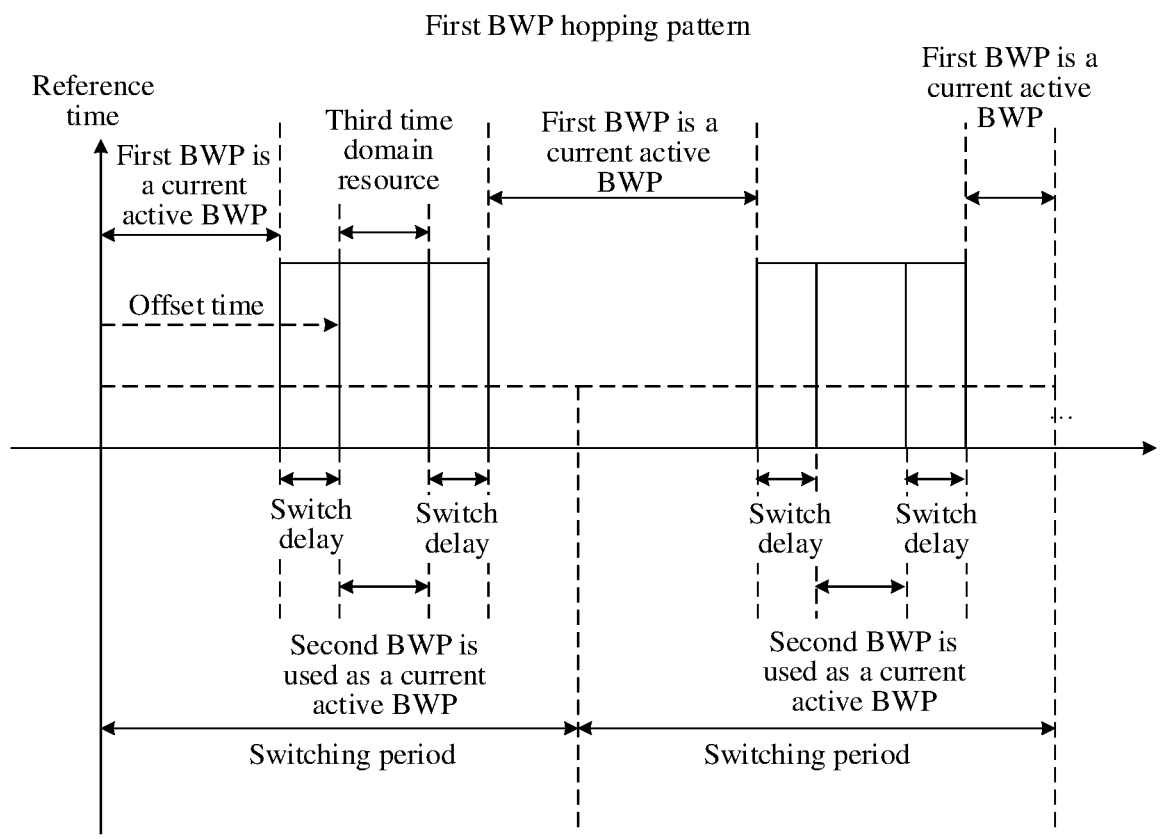
FIG. 12 is a schematic diagram of information in configuration information on a timeline according to an embodiment of this application.

The following first describes the several pieces of information one by one with reference to FIG. 12.

Period (switching period): It is a time length, and the time length represents a duration starting from the reference time. With reference to FIG. 12, the period is a switching period in which the terminal device switches between the first BWP and the second BWP. Generally, the period may be configured by the network device side by using an RRC message or a SIB, or may be configured together with an upper-layer message (the upper-layer message is an RRC message or a SIB) for configuring the first BWP, or may be separately configured by using another upper-layer message after the first BWP is configured. With reference to FIG. 12, in the first period starting from the reference time, the terminal device first uses the first BWP as a current active BWP, then switches to use the second BWP as a current active BWP after a switch delay, and then switches to use the first BWP as a current active BWP after a switch delay. In this case, the first BWP is used as a current active BWP on some time domain resources in the first period, and on some time domain resources in the second period. An end moment of the first period is a start moment of the second period.

Duration (third time domain resource): It is a time period in which the terminal device switches to the second BWP and uses the second BWP as a current active BWP to normally receive and send data. After the duration expires, the terminal device needs to switch from the second BWP back to the first BWP. Generally, the duration may be configured by the network device side by using an RRC message or a SIB system message, or may be configured together with the upper-layer message for configuring the first BWP, or the duration may be separately configured by the network device by using another upper-layer message after the first BWP is configured.

Offset: The offset and the reference time that are shown in FIG. 12 may determine a start moment of the duration, that is, the offset is an offset time of the start moment of the duration relative to the reference time. When the offset is defined relative to a start moment of the period, a possible definition manner may be as follows: If a current moment $T_{present\ time}$ (a moment in a period) meets offset= $T_{present\ time}$% period, where % is a modulo operator, that is, a remainder of $T_{present\ time}$% period is equal to the offset, it may be considered that the current moment $T_{present\ time}$ corresponds to a start moment of the offset. $T_{present\ time}$ is relative to the reference time. For example, if the reference time is a system frame number (SFN) 0 of the NR protocol, $T_{present\ time}$ represents an SFN, a subframe number, a slot number, an orthogonal frequency division multiplexing (OFDM) symbol (Index), and the like at the current moment.

Active BWP switch delay: It is a switch delay of performing BWP switching by the terminal device, and is related to a capability of the terminal device. The terminal device is not allowed to receive or send data during the active BWP switch delay. For example, as shown in FIG. 12, the active BWP switch delay may be understood as a duration of a process and a state in which the terminal device switches from the first BWP to the second BWP, and also refers to a duration of a process and a state in which the terminal device switches from the second BWP to the first BWP. A current value and definition of the active BWP switch delay may be determined based on the NR protocol. Considering occurrence of a new terminal type in the future, a new value and definition of the active BWP switch delay may occur. For example, for a REDCAP terminal proposed in a 3GPP proposal, a value of the active BWP switch delay is different from a value provided in the NR protocol.

After the network device configures parameters such as the period, the duration, the offset, and the active BWP switch delay for the terminal device by using an RRC message, a SIB, or another message, and indicates the terminal device to validate and activate a BWP hopping for switching, the terminal device may actively initiate and complete BWP switching between a plurality of BWPs based on the parameters such as the period, the duration, the offset, and the active BWP switch delay.

It is to be noted that in this application, the network device may configure a plurality of BWP hopping patterns (including parameters such as a source BWP identifier (ID), a target BWP ID, a period, a duration, an offset, and an active BWP switch delay) for one source BWP of the terminal device by using an RRC message or a SIB. The source BWP may be a BWP on which SSB-based RRM and RLM measurement cannot be performed, and the target BWP may be a BWP including spectrum resources for an SSB, a SIB, a paging message, and the like. The plurality of BWP hopping patterns do not conflict in time domain ("do not conflict in time domain" may be understood as follows: as calculated based on the plurality of BWP hopping patterns, the terminal device does not simultaneously use two different BWPs as current active BWPs, and an active BWP switch delay needs to be ensured as a transition for each BWP switching; "do not conflict in time domain" may be ensured by the network device by configuring appropriate BWP hopping pattern parameters).

Figure 13:
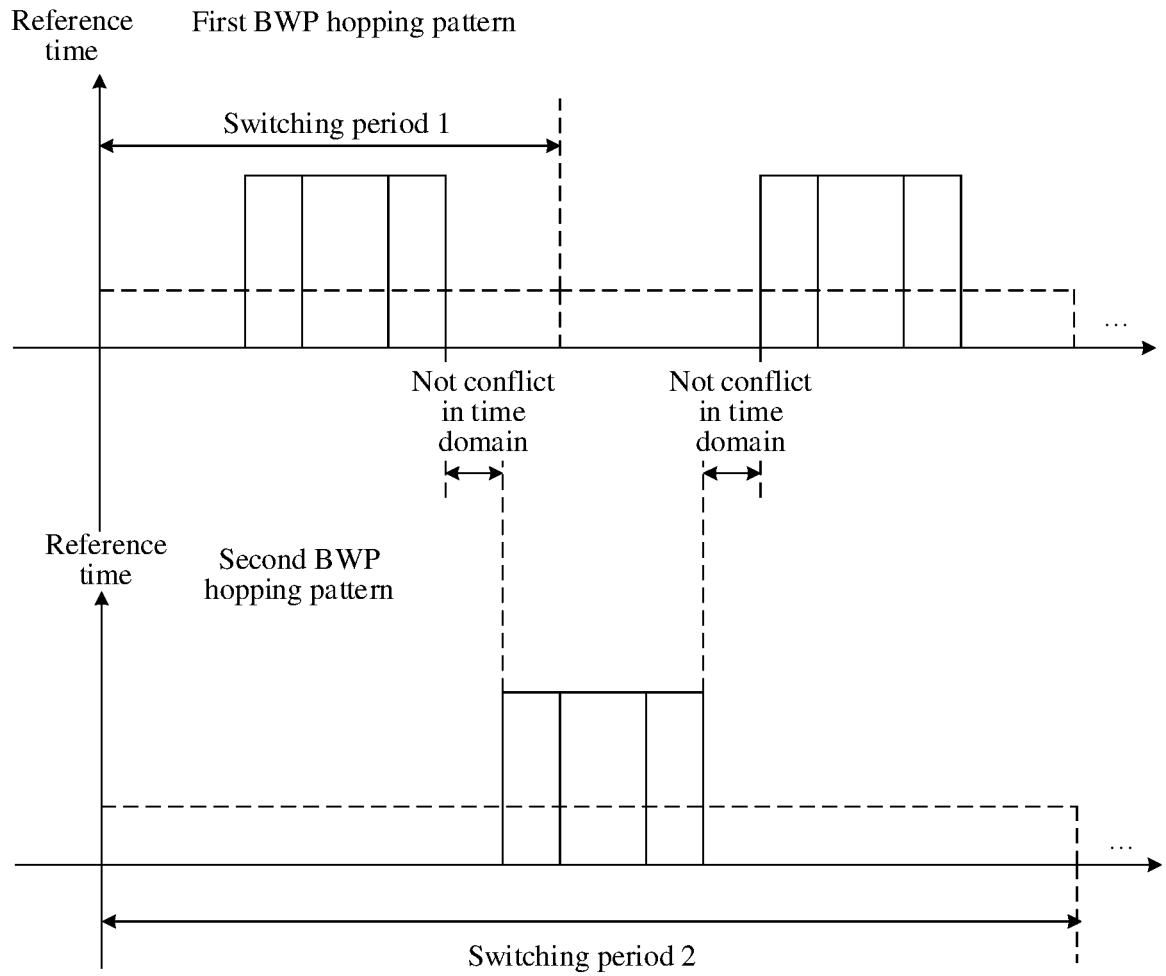
FIG. 13 is a schematic diagram of information in two sets of configuration information on a timeline according to an embodiment of this application.

For example, as shown in FIG. 13, the terminal device may simultaneously trigger a BWP hopping pattern 1 and a BWP hopping pattern 2 that are configured for the source BWP to be validated. Similarly, when the network device configures more than two BWP hopping patterns for the terminal device, the terminal device simultaneously performs the plurality of BWP hopping patterns provided that the plurality of BWP hopping patterns do not conflict in time domain. Parameters in the BWP hopping pattern 1 may include: a source $BWP_{id,1}$, a target $BWP_{id,1}$, a period$_1$ (switching period 1), a duration$_1$, an offset$_1$, and an active BWP switch delay$_1$. Parameters in the BWP hopping pattern 2 include: a source $BWP_{id,2}$, a target $BWP_{id,2}$, a period$_2$ (switching period 2), a duration$_2$, an offset$_2$, and an active BWP switch delay$_2$.

The source $BWP_{id,1}$ and the source $BWP_{id,2}$ may be, for example, the first BWP in FIG. 12, and generally, values of the source $BWP_{id,1}$ and the source $BWP_{id,2}$ are equal. In other words, IDs of the two source BWPs are the same. That is, source BWPs of a plurality of BWP hopping patterns configured for a same terminal device are a same BWP.

The target $BWP_{id,1}$ may be, for example, the second BWP in FIG. 11, and the target $BWP_{id,2}$ may be, for example, a third BWP, and values of the target $BWP_{id,1}$ and the target $BWP_{id,2}$ may be different. Provided that no conflict occurs in time domain, the same terminal device may switch from the same source BWP to different target BWPs by using the plurality of configured BWP hopping patterns.

The period$_1$ and the period$_2$ may be, for example, the switching period in FIG. 12. Periods of different BWP hopping patterns may be separately configured, provided that no conflict occurs in time domain.

The offset$_1$ and the offset$_2$ may be, for example, the offset time offset in FIG. 12. Offsets of different BWP hopping patterns may be separately configured, provided that no conflict occurs in time domain.

For example, the active BWP switch delay$_1$ and the active BWP switch delay$_2$ may be the switch delay active BWP switch delay of performing BWP switching by the terminal device in FIG. 11. Generally, values of the active BWP switch delay$_1$ and the active BWP switch delay$_2$ of the same terminal device may be the same. However, considering requirements in different scenarios, values of the active BWP switch delay$_1$ and the active BWP switch delay$_2$ of the same terminal device may alternatively be different. For example, a value of the active BWP switch delay$_1$ in a scenario in which the terminal device receives an SSB on a BWP is different from a value of the active BWP switch delay$_2$ in a scenario in which the terminal device receives a SIB x on a BWP.

In some embodiments, in the first BWP hopping pattern, a length of the first time domain resource and a length of the second time domain resource are equal to a switch delay of switching between the first BWP and the second BWP. The switch delay is a time length for switching from one BWP to the other BWP. The switch delay may be predefined in the terminal device, or may be sent by the network device to the terminal device. For example, the one or more pieces of configuration information further include indication information of the switch delay.

It is to be noted that the switch delay in this application may be less than a BWP switch delay defined in an existing standard. For example, the switch delay in the BWP hopping pattern in this application may be less than a delay of BWP switching indicated by using DCI in an existing standard.

In some embodiments, if the one or more pieces of configuration information carry the indication information of the switch delay, before the terminal device receives the configuration information, the terminal device may further send a switch delay (for example, a supported minimum switch delay) supported by the terminal device to the network device. The switch delay is related to a capability of the terminal device. In this way, when the network device indicates the switch delay in the configuration information, the switch delay indicated by the configuration information is greater than or equal to the switch delay supported by the terminal device. In this way, the terminal device can have sufficient time to complete switching, thereby improving a switching success rate.

The switch delay reported by the terminal device to the network device is less than a first threshold, and the first threshold may be 0.75 ms or 2.25 ms.

It is to be noted that in this embodiment of this application, a length of the switch delay supported by the terminal device may be a radio frequency (RF) retuning time. The RF retuning time is, for example, a time length corresponding to two OFDM symbols, or is not greater than 140 microseconds, and is specifically determined based on the capability of the terminal device.

Optionally, in this embodiment of this application, the switch delay supported by the terminal device may be represented by using a quantity of OFDM symbols, a quantity of slots (slot), a specific time value (for example, 140 μs), or another form, and is not specifically limited. Specifically, the switch delay supported by the terminal device may be a same time value when corresponding to different SCSs. For example, the switch delay is a value not greater than 500 μs, for example, 140 μs, 200 μs, 250 μs, or 400 μs. Specifically, when the switch delay is represented by using a quantity of OFDM symbols, for SCS=15 kHz, the switch delay is two OFDM symbols; for SCS=30 kHz, the switch delay is four OFDM symbols; for SCS=60 kHz, the switch delay is M OFDM symbols, where M is an integer not greater than 8; and for SCS=120 kHz, the switch delay is K OFDM symbols, where K is an integer not greater than 16. Alternatively, switch delays corresponding to different SCSs may correspond to different time values. For example, switch delays corresponding to SCS=15 kHz and SCS=30 kHz are a time value, and switch delays corresponding to SCS=60 kHz and SCS=120 kHz are another time value.

In some embodiments, based on the implementations in Manner 1, Manner 2, and Manner 3, when switching to the second BWP, the terminal device may perform RRM or RLM on the second BWP, or receive a broadcast message or a paging message on the second BWP.

It may be understood that, with the first BWP hopping pattern, when the terminal device works on the first BWP, if the first BWP does not support RRM, RLM, or receiving of a broadcast message or a paging message, the terminal device may switch from the first BWP to the second BWP, and the terminal device may perform RRM or RLM, or receive a broadcast message or a paging message on the second BWP. When the terminal device completes working on the second BWP, the terminal device may switch from the second BWP to the first BWP on the second time domain resource.

It is to be noted that, the switching period in this application is greater than or equal to a transmission period of a reference signal for RRM, a broadcast message, or a paging message. The transmission period may be understood as a time length in which the network device actually sends a reference signal for RRM, a broadcast message, or a paging message. This can ensure that the terminal device can receive, in a duration of one switching period, the reference signal for RRM, the broadcast message, or the paging message, thereby improving a success rate of receiving, by the terminal device, the reference signal for RRM, the broadcast message, or the paging message. The reference signal for RRM may be, for example, an SSB or a channel state information-reference signal (CSI-RS).

In some embodiments, the switching period in this application may be an integer multiple of the transmission period of the reference signal for RRM, the broadcast message, or the paging message.

In some embodiments, the terminal device may select the transmission period based on a protocol between the terminal device and the network device and the capability of the terminal device, and report the transmission period to the network device.

In some embodiments, the terminal device may send an SSB receiving period supported by the terminal device, a SIB receiving period supported by the terminal device, or a paging message receiving period supported by the terminal device to the network device. In this way, when the network device configures the switching period, the switching period needs to be less than or equal to the SSB receiving period supported by the terminal device, the SIB receiving period supported by the terminal device, or the paging message receiving period supported by the terminal device, so that the terminal device can receive an SSB, a SIB, or a paging message in one switching period.

In some embodiments, the SSB receiving period supported by the terminal device may be understood as a maximum SSB receiving period supported by the terminal device, the SIB receiving period supported by the terminal device may be understood as a maximum SIB receiving period supported by the terminal device, and the paging message receiving period supported by the terminal device may be understood as a maximum paging message receiving period supported by the terminal device.

The RRM may include measurement of reference signal received power (RSRP), reference signal received quality (RSRQ), and a received signal strength indicator (RSSI).

The RRM and the RLM may be measurement based on a reference signal. For example, the reference signal may be an SSB or a CSI-RS.

The broadcast message may include a MIB and a SIB, and the SIB may include a SIB1, a SIB2, a SIB3, a SIB4, a SIB5, a SIB6, a SIB7, a SIB8, a SIB9, and the like.

It is to be noted that the terminal device may alternatively perform only RRM on the second BWP. For example, if the terminal device is in a connected state, the terminal device may receive a broadcast message and a paging message by using RRC dedicated (RRC dedicated) information.

In some embodiments, after the terminal device receives the first BWP hopping pattern, when the first BWP hopping pattern is validated may be implemented as follows:

The terminal device validates the BWP hopping pattern after activating the first BWP.

Alternatively, the terminal device receives validation indication information, the validation indication information indicates to validate the BWP hopping pattern, and the terminal device validates the BWP hopping pattern based on the validation indication information. The validation indication information may be carried in an RRC message, a SIB, or a configuration message for configuring the first BWP.

In some embodiments, one source BWP may correspond to a plurality of target BWPs. For example, the first BWP may be switched to the second BWP, and the first BWP may also be switched to the third BWP. Therefore, when configuring the first BWP hopping pattern for the first BWP, the network device may further configure a second BWP hopping pattern for the first BWP. Therefore, this embodiment of this application may further include: The terminal device receives the second BWP hopping pattern. The second BWP hopping pattern indicates one or more pieces of configuration information for periodically switching between the first BWP and the third BWP. The terminal device periodically switches between the first BWP and the third BWP based on the second BWP hopping pattern. For an implementation of the second BWP hopping pattern, refer to the implementation of the first BWP hopping pattern.

In addition, if the first BWP hopping pattern and the second BWP hopping pattern are simultaneously configured for the terminal device, the terminal device simultaneously validates the first BWP hopping pattern and the second BWP hopping pattern.

It is to be noted that the BWP hopping pattern in this application is understood as follows: Each source BWP corresponds to one BWP hopping pattern, and different source BWPs correspond to different BWP hopping patterns. Alternatively, different source BWPs and target BWPs (different source BWPs and different target BWPs) correspond to a same BWP hopping pattern, and activation of the BWP hopping pattern is related only to a current active BWP.

Therefore, in this embodiment of this application, when the terminal device needs to switch between two BWPs for a plurality of times, the terminal device may independently switch between the BWPs based on configuration information configured by the network device. The network device side does not need to send an RRC message or a DCI message to indicate the terminal device to initiate BWP switching, and the terminal device does not need to perform BWP switching in a timer-based manner. This can avoid defects such as a large delay, large overheads (for example, RRC message overheads, PDCCH overheads, and overheads for active data transmission scheduling), impact on rate performance of the terminal device, impact on network performance, and impact on service QoS that are caused by RRC-based BWP switching, DCI-based BWP switching, and timer-based BWP switching.

With the BWP hopping pattern provided in this application, this application provides a bandwidth adaptation method. The method is described by using an example in which a single BWP hopping pattern is configured, and a terminal device periodically performs BWP switching based on parameters of the single configured BWP hopping pattern.

Embodiment 1

In Embodiment 1, for example, a single BWP hopping pattern is configured for "SSB-based RRM and RLC measurement". The single BWP hopping pattern may also be applied to another scenario or purpose, for example, a scenario of receiving a SIB1 to a SIB9 or a scenario of receiving a paging message. Principles and procedures thereof are the same.

A plurality of BWPs are configured for a terminal device. A first BWP is a dedicated BWP or a default BWP, and is used to receive and send service data, and a frequency domain bandwidth of the first BWP does not include a complete SSB (not all subcarriers of the SSB are in the spectrum bandwidth of the first BWP), so that SSB-based RRM and RLM cannot be performed. A second BWP is a dedicated BWP, an initial BWP, or a default BWP, a spectrum range of the second BWP includes a complete SSB, and an SSB sending period in the second BWP is 20 ms (or may be another value defined in the NR protocol, where 20 ms is merely an example). Therefore, when the terminal device uses the first BWP as a current active BWP to receive and send data, a first BWP hopping pattern in which a target BWP is the second BWP may be configured for the terminal device, so that the terminal device periodically switches to the second BWP to perform SSB-based RRM and RLM.

Figure 14:
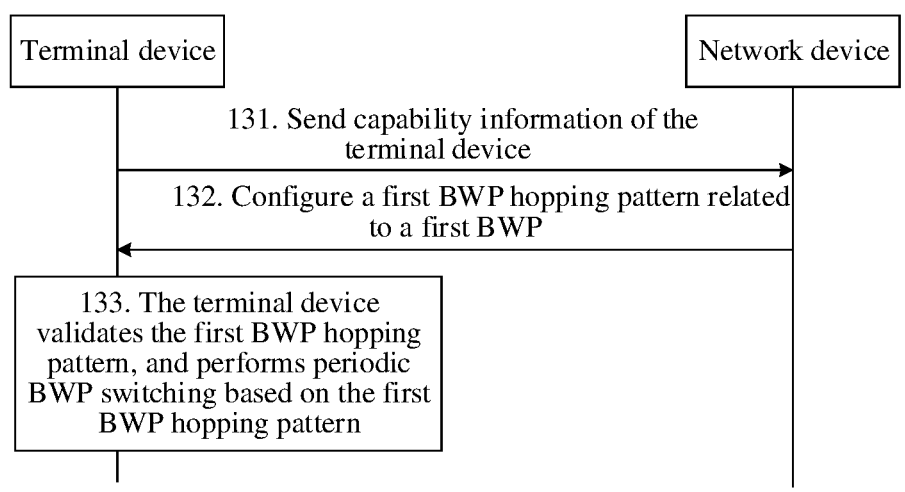
FIG. 14 is a signaling interaction diagram of a BWP switching method according to an embodiment of this application.

As shown in FIG. 14, the method may include the following steps.

131. After the terminal device accesses a network device, the terminal device sends capability information of the terminal device to the network device. Correspondingly, the network device receives the capability information sent by the terminal device.

132. The network device configures, for the terminal device, the first BWP hopping pattern related to the first BWP. Correspondingly, the terminal device may receive the first BWP hopping pattern configured by the network device.

In some embodiments, if key information of the first BWP hopping pattern includes a period, a duration, an offset, and an active BWP switch delay:

When the terminal device does not report the capability information in step 131, the period may be configured to an actual sending period in which the network device side sends an SSB, the active BWP switch delay may be determined based on a capability of the terminal device and a protocol, and a length of the duration needs to be greater than or equal to a transmission period of the SSB, for example, 2 ms. The period and the offset need to be configured so that the duration includes the transmission period of the SSB.

For example, a value of the period is 20 ms, a value of the offset is 0 ms, a value of the duration is 2 ms, and a value of the BWP switch delay is 500 µs. Certainly, a configuration of a value of each piece of configuration information in the first BWP hopping pattern is not limited to the value, and may alternatively be another value properly. 133. The terminal device validates the first BWP hopping pattern, and performs periodic BWP switching based on the first BWP hopping pattern.

The terminal device may validate the first BWP hopping pattern in a plurality of manners. For example, refer to the following manner A and manner B.

Figure 15:
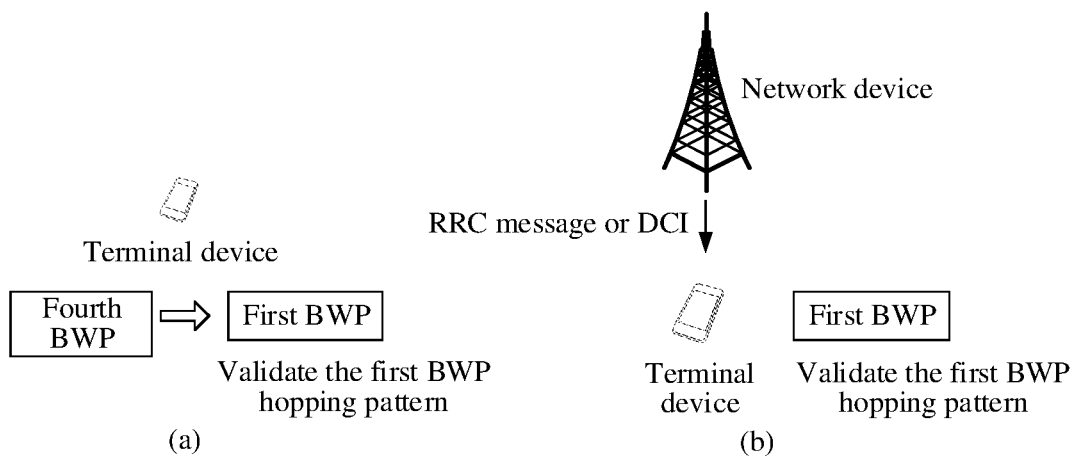
FIG. 15 is a schematic diagram of a manner in which a terminal device validates a first BWP hopping pattern according to an embodiment of this application.

Manner A: As shown in (a) in FIG. 15, after the network device configures the first BWP hopping pattern for the terminal device, once the terminal device switches from another BWP to the first BWP, and a switching manner of switching to the first BWP is not active switching based on a BWP hopping pattern (for example, RRC-based BWP switching, DCI-message RRC switching, or timer-based BWP switching), for example, the terminal device switches from a fourth BWP to the first BWP, the terminal device uses the first BWP as an active BWP, and immediately validates the first BWP hopping pattern in which a value of a source $BWP_{id}$ is equal to the first BWP.

Manner B: As shown in (b) in FIG. 15, when the terminal device has used the first BWP as an active BWP, the network device may indicate, in an RRC message for configuring the first BWP hopping pattern, the terminal device to validate the first BWP hopping pattern. Alternatively, the network device pre-configures the first BWP hopping pattern for the terminal device, and when required, the network device validates the configured first BWP hopping pattern by using an RRC message, DCI, or the like.

Figure 16:
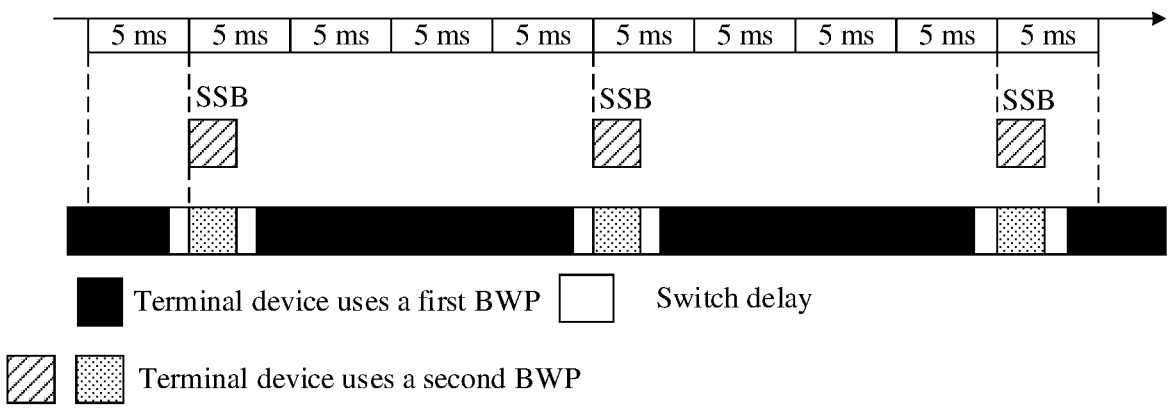
FIG. 16 is a schematic diagram of switching between a first BWP and a second BWP by a terminal device according to an embodiment of this application.

After the terminal device validates the first BWP hopping pattern, the terminal device may perform periodic BWP switching based on the configured configuration information, and the terminal device may periodically switch to a target BWP (the second BWP) to perform SSB-based RRM and RLM measurement, and then switch back to a source BWP (the first BWP), as shown in FIG. 16.

It may be understood that the technical solution of BWP switching in this application is bidirectional switching (while timer bwp-InactivityTimer-based BWP switching in an existing technology is unidirectional switching), and the network device side does not need to deliver an RRC message or DCI for each BWP switching. Therefore, in this application, after the BWP hopping pattern is configured, the terminal device actively performs periodic BWP switching based on the BWP hopping pattern, so that a delay is low, overheads are low, and little impact is caused on network and user performance.

Similarly, with the BWP hopping pattern provided in this application, this application provides a bandwidth adaptation method. The method is described by using an example in which a plurality of BWP hopping patterns are configured, and a terminal device periodically performs BWP switching based on parameters of the plurality of configured BWP hopping patterns.

Embodiment 2

In Embodiment 2, for example, two BWP hopping patterns that do not conflict in time domain are configured for a terminal device. A principle and procedure of configuring more than two BWP hopping patterns are the same as a principle and procedure of configuring two BWP hopping patterns. For example, configuring three BWP hopping patterns is merely configuring two BWP hopping patterns and adding one BWP hopping pattern, and similarly, configuring two BWP hopping patterns is merely configuring one BWP hopping pattern and adding one BWP hopping pattern.

Herein, for example, a first BWP hopping pattern and a second BWP hopping pattern that do not conflict in time domain are respectively configured for "SSB-based RRM and RLC measurement" and "SIB1 obtaining". The configured first BWP hopping pattern and second BWP hopping pattern that do not conflict in time domain may also be used for another scenario or purpose (for example, obtaining a SIB2 to a SIB9, and obtaining a paging message). Principles and procedures thereof are the same.

For example, a plurality of BWPs are configured for the terminal device. A first BWP is a dedicated BWP or a default BWP, and is used to receive and send service data, a frequency domain bandwidth of the first BWP does not include a complete SSB (not all subcarriers of the SSB are in the spectrum bandwidth of the first BWP), and the frequency domain bandwidth of the first BWP does not include a complete SIB1 (not all subcarriers of the SIB1 are in the spectrum bandwidth of the first BWP), so that the terminal device cannot perform SSB-based RRM or RLM or obtain a SIB1 on the first BWP. A second BWP is a dedicated BWP, an initial BWP, or a default BWP, the second BWP includes a complete SSB, and an SSB sending period in the second BWP is 20 ms (or may be another value defined in the NR protocol, where 20 ms is merely an example). In addition, a third BWP is a dedicated BWP, an initial BWP, or a default BWP, the third BWP includes a complete SIB1, and a SIB1 sending period in the third BWP is 20 ms (or may be another value defined in the NR protocol, where 20 ms is merely an example).

Therefore, when the terminal device uses the first BWP as a current active BWP to receive and send data, the first BWP hopping pattern and the second BWP hopping pattern that do not conflict in time domain may be simultaneously configured for the terminal device.

First BWP hopping pattern: A source BWP is the first BWP, and a target BWP is the second BWP, so that the terminal device can periodically switch from the first BWP to the second BWP to perform SSB-based RRM and RLM.

Second BWP hopping pattern: A source BWP is the first BWP, and a target BWP is the third BWP, so that the terminal device can periodically switch from the first BWP to the third BWP to obtain a SIB1.

Figure 17:
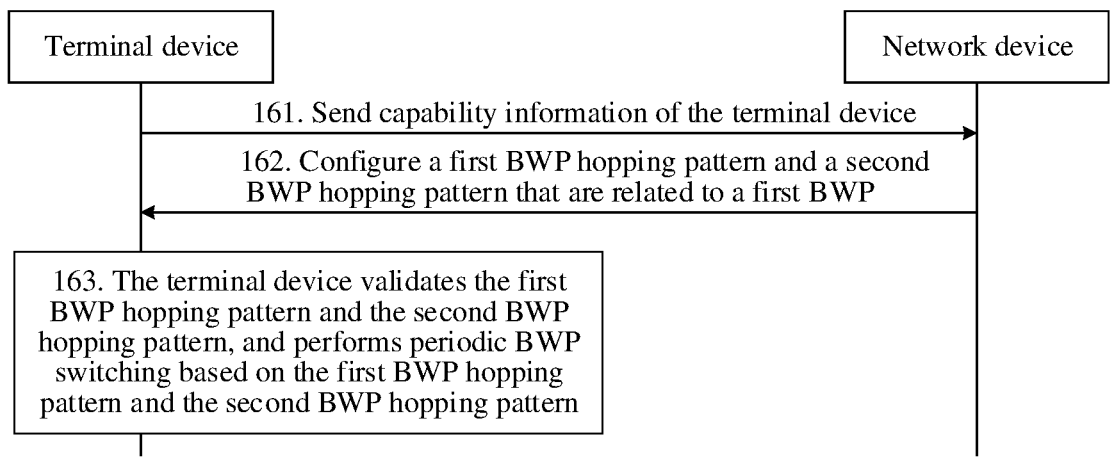
FIG. 17 is a schematic diagram of a manner in which a terminal device validates a first BWP hopping pattern according to an embodiment of this application.

A specific implementation procedure and related descriptions are as follows: As shown in FIG. 17, the method may include the following steps.

161. After the terminal device accesses a network device, the terminal device sends capability information of the terminal device to the network device. Correspondingly, the network device receives the capability information sent by the terminal device.

An implementation of step 161 is similar to an implementation of step 131.

162. The network device configures, for the terminal device, the first BWP hopping pattern and the second BWP hopping pattern that are related to the first BWP. Correspondingly, the terminal device receives the first BWP hopping pattern and the second BWP hopping pattern that are related to the first BWP and that are configured by the network device.

For an implementation in which the network device configures the first BWP hopping pattern for the terminal device when the terminal device reports the capability information, refer to step 132. For an implementation in which the network device configures the first BWP hopping pattern for the terminal device when the terminal device does not report the capability information, also refer to step 132.

An implementation in which the network device configures the second BWP hopping pattern for the terminal device is similar to the implementation in which the network device configures the first BWP hopping pattern.

In some embodiments, the implementation of configuring the second BWP hopping pattern may be as follows: When the terminal device does not report the capability information in step 131, a period may be configured to an actual sending period in which the network device side sends a SIB1, an active BWP switch delay may be determined based on a capability of the terminal device and a protocol, and a length of a duration needs to be greater than or equal to a transmission period of the SIB1, for example, 5 ms. The period and an offset need to be configured so that the duration includes the transmission period of the SSB.

Similarly, for example, in the second BWP hopping pattern, a value of the period is 20 ms, a value of the offset is 10 ms, a value of the duration is 5 ms, and a value of the BWP switch delay is 500 ps. Certainly, a configuration of a value of each piece of configuration information in the second BWP hopping pattern is not limited to the value, and may alternatively be another value properly.

In addition, the configuration information in the first BWP hopping pattern and the first BWP hopping pattern may be configured by the network device side by using an upper-layer message (an RRC message or a SIB), or may be configured together with an upper-layer message for configuring the first BWP, or may be separately configured by using another upper-layer message after the first BWP is configured.

163. The terminal device validates the first BWP hopping pattern and the second BWP hopping pattern, and performs periodic BWP switching based on the first BWP hopping pattern and the second BWP hopping pattern.

When validating the first BWP hopping pattern, the network device validates the second BWP hopping pattern.

Figure 18:
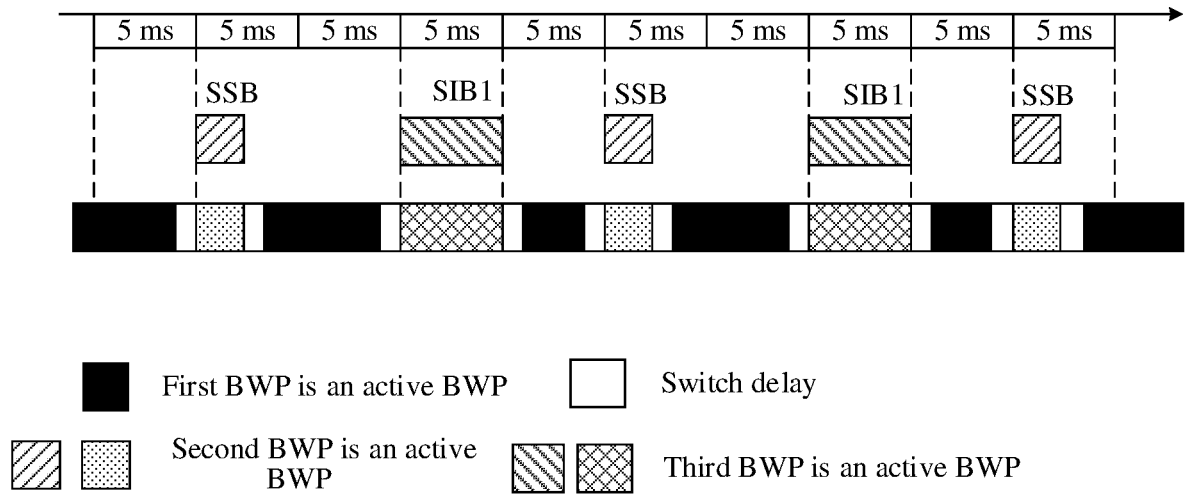
FIG. 18 is a schematic diagram of switching between a first BWP and a second BWP and switching between the first BWP and a third BWP by a terminal device by using two BWP hopping patterns according to an embodiment of this application.

As shown in FIG. 18, after the terminal device validates the first BWP hopping pattern and the second BWP hopping pattern, the terminal device may perform periodic BWP switching based on the configuration information in the first BWP hopping pattern and the second BWP hopping pattern. The switching process includes: The terminal device switches from a source BWP (the first BWP) to a first target BWP (the second BWP) based on the first BWP hopping pattern to perform SSB-based RRM and RLM measurement, and then switches back to the source BWP (the first BWP). At the same time, when the first BWP hopping pattern and the second BWP hopping pattern do not conflict in time domain, the terminal device switches from the source BWP (the first BWP) to a second target BWP (the third BWP) based on the second BWP hopping pattern to obtain a SIB1, and then switches back to the source BWP (the first BWP).

Therefore, after the network device configures related configuration information of a plurality of BWP hopping patterns for the terminal device by using an upper-layer message (an RRC message or a SIB), after the terminal device validates the plurality of BWP hopping patterns, the terminal device may perform periodic BWP switching from a source BWP to a plurality of target BWPs based on the configuration information of the plurality of BWP hopping patterns, and the network device does not need to deliver an RRC message or a DCI message for each BWP switching of the terminal device. In this way, a switch delay can be reduced, signaling overheads can be reduced, and performance of the terminal device and quality of service can be improved.

The foregoing describes in detail the switching method in embodiments of this application with reference to FIG. 10 to FIG. 18. With reference to FIG. 19 to FIG. 22, the following describes in detail a communication apparatus in embodiments of this application, for example, a terminal device, an apparatus (such as a processor, a circuit, or a chip) used for a terminal device, a network device, or an apparatus (such as a processor, a circuit, or a chip) used for a network device.

Figure 19:
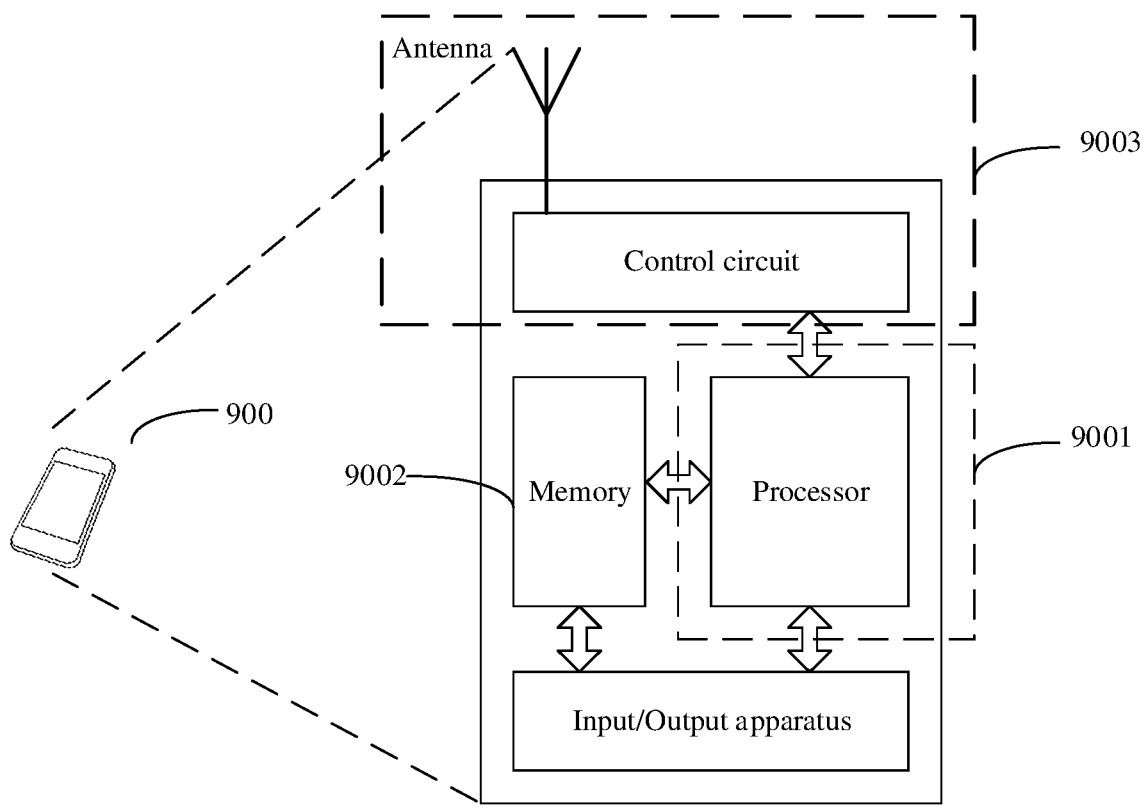
FIG. 19 is a schematic diagram of a structure of a terminal device according to an embodiment of this application.

FIG. 19 is a schematic diagram of a structure of a terminal device according to an embodiment of this application. The terminal device is applicable to the system shown in FIG. 9, and performs a function of the terminal device in the foregoing method embodiment. For ease of description, FIG. 19 shows only main components in the terminal device. As shown in FIG. 19, the terminal device 900 includes a processor 9001, a memory 9002, a control circuit, an antenna, and an input/output apparatus. The processor 9001 is mainly configured to: process a communication protocol and communication data, control the entire terminal device, execute a software program, and process data of the software program, for example, configured to support the terminal device in performing actions described in the foregoing method embodiment, for example, configured to perform steps 902, 133, and 163. The memory 9002 is mainly configured to store a software program and data. For example, the software program may be a program corresponding to the foregoing method embodiment, and the data may be the configuration information. The control circuit is mainly configured to convert a baseband signal and a radio frequency signal and process the radio frequency signal. The control circuit and the antenna together may also be referred to as a transceiver 9003, mainly configured to receive and send radio frequency signals in an electromagnetic wave form. For example, the transceiver 9003 is configured to perform steps 901, 131, 132, 161, and 162. The input/output apparatus, such as a touchscreen, a display screen, or a keyboard, is mainly configured to receive data input by a user and output data to the user.

After the terminal device is powered on, the processor 9001 may read the software program in the memory, explain and execute an instruction of the software program, and process data of the software program. When data needs to be sent wirelessly, the processor 9001 performs baseband processing on the to-be-sent data, and then outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor 9001 converts the baseband signal into data, and processes the data.

A person skilled in the art may understand that for ease of description, FIG. 19 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor in FIG. 19. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected by using various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

Figure 20:
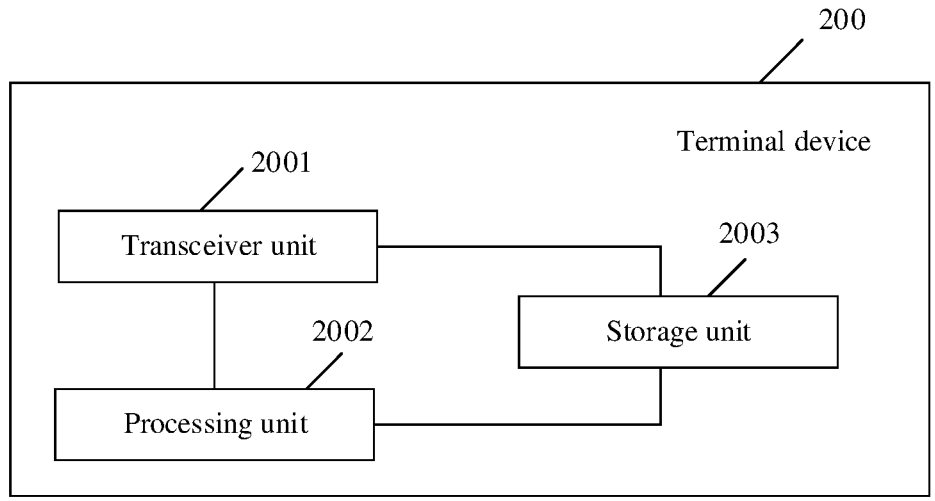
FIG. 20 is a schematic diagram of a structure of a terminal device according to an embodiment of this application.

In this embodiment of this application, the antenna having a transceiver function and the control circuit may be considered as a transceiver unit 2001 of a terminal device 20, for example, configured to support the terminal device in performing a receiving function and a sending function. The processor having a processing function is considered as a processing unit 2002 of the terminal device 20. The memory having a storage function is considered as a storage unit 2003 of the terminal device 20. As shown in FIG. 20, a terminal device 200 includes a transceiver unit 2001, a processing unit 2002, and a storage unit 2003. The transceiver unit may also be referred to as a transceiver machine, a transceiver, a transceiver apparatus, or the like. Optionally, a component that is in the transceiver unit 2001 and that is configured to implement a receiving function may be considered as a receiving unit, and a component that is in the transceiver unit 2001 and that is configured to implement a sending function may be considered as a sending unit. In other words, the transceiver unit 2001 includes a receiving unit and a sending unit. The receiving unit may also be referred to as a receiver, an input port, a receive circuit, or the like. The sending unit may also be referred to as a transmitter, a transmitter machine, a transmit circuit, or the like.

The processing unit 2002 may be configured to execute an instruction stored in the storage unit 2003, to control the transceiver unit 2001 to receive a signal and/or send a signal, to complete a function of the terminal device in the foregoing method embodiment. In an implementation, a function of the transceiver unit 2001 may be implemented by using a transceiver circuit or a dedicated transceiver chip.

Figure 21:
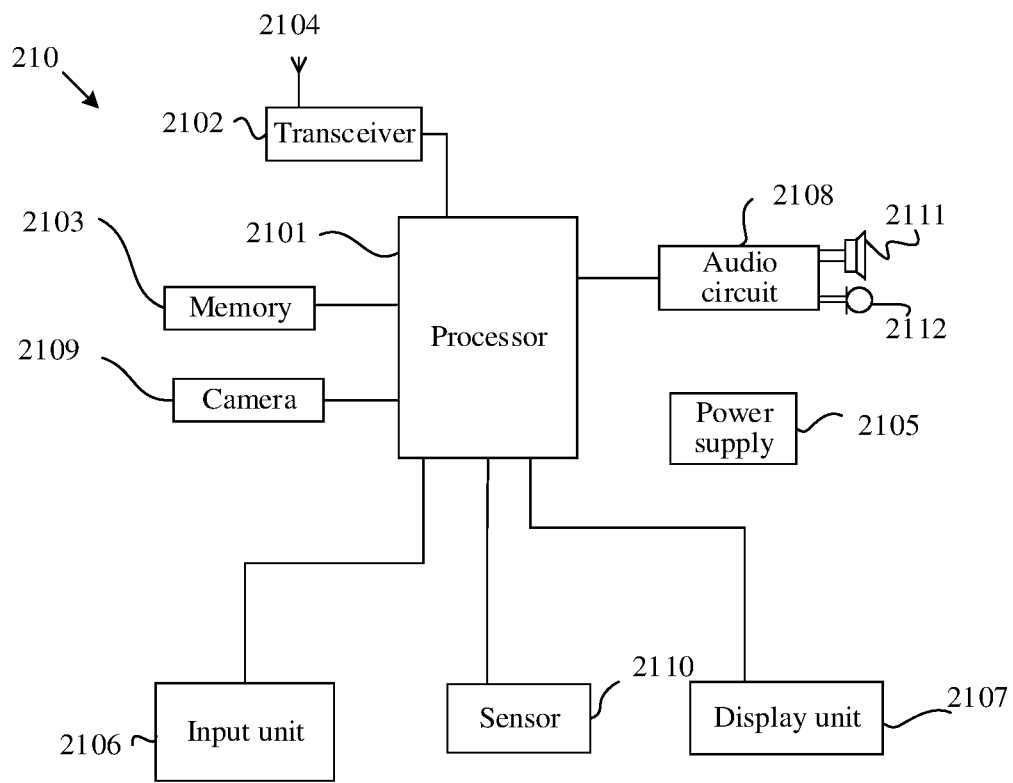
FIG. 21 is a schematic diagram of a structure of a terminal device according to an embodiment of this application.

FIG. 21 is a schematic diagram of another structure of a terminal device according to an embodiment of this application. As shown in FIG. 21, a terminal device 210 includes a processor 2101 and a transceiver 2102. Optionally, the terminal device 210 further includes a memory 2103. The processor 2101, the transceiver 2102, and the memory 2103 may communicate with each other by using an internal connection path to transfer a control signal and/or a data signal. The memory 2103 is configured to store a computer program. The processor 2101 is configured to invoke the computer program from the memory 2103 and run the computer program, to control the transceiver 2102 to receive and send signals. The terminal device 210 may further include an antenna 2104, configured to send, by using a radio signal, uplink data or uplink control signaling output by the transceiver 2102.

The processor 2101 and the memory 2103 may be integrated into one processing apparatus. The processor 2101 is configured to execute program code stored in the memory 2103 to implement the foregoing functions. During specific implementation, the memory 2103 may alternatively be integrated into the processor 2101, or may be independent of the processor 2101.

Specifically, the terminal device 210 may correspond to the embodiments of the method according to the embodiments of this application. In addition, the units in the terminal device 210 and the foregoing other operations and/or functions are respectively used to implement corresponding procedures in the embodiments of the method.

The processor 2101 may be configured to perform an action that is described in the foregoing method embodiment and that is implemented by the terminal device, and the transceiver 2102 may be configured to perform a sending or receiving action of the terminal device that is described in the foregoing method embodiment. For details, refer to the description in the foregoing method embodiment. Details are not described herein again.

Optionally, the terminal device 210 may further include a power supply 2105, configured to supply power to components or circuits in the terminal device.

In addition, to improve functions of the terminal device, the terminal device 210 may further include one or more of the following: an input unit 2106, a display unit 2107, an audio circuit 2108, a camera 2109, a sensor 2110, and the like. The audio circuit may further include a speaker 2111, a microphone 2112, and the like.

Figure 22:
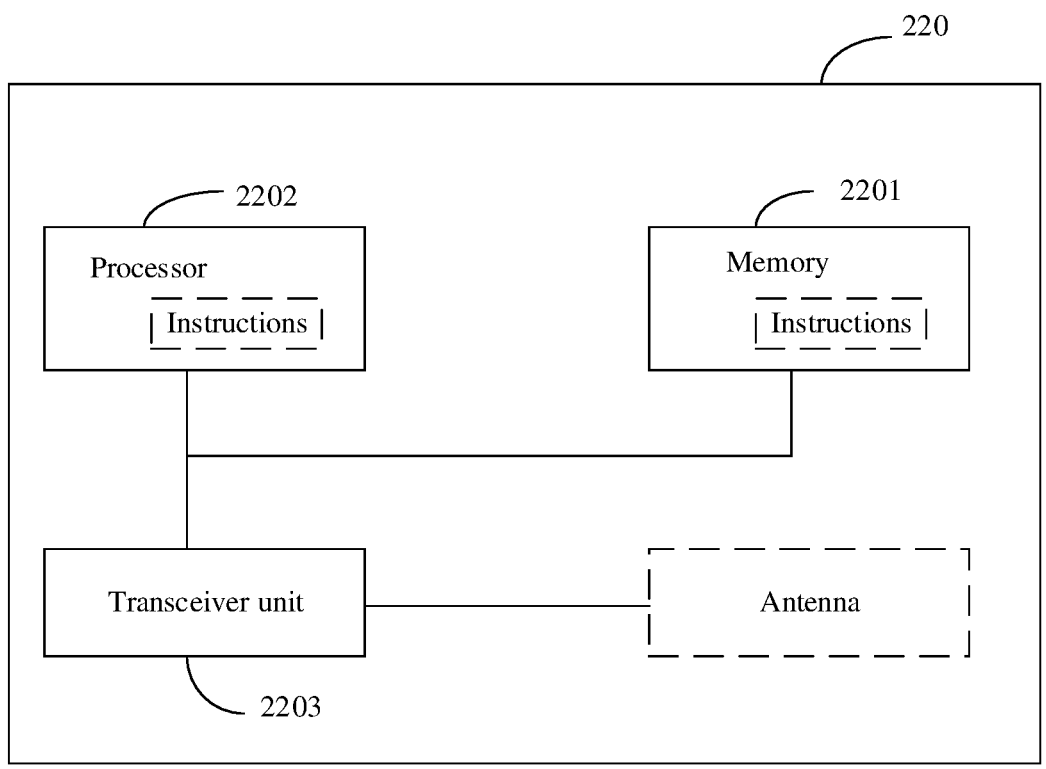
FIG. 22 is a schematic diagram of a structure of a network device according to an embodiment of this application.

FIG. 22 is a schematic diagram of a structure of a network device 220. The network device 220 may be configured to implement the method described in the foregoing method embodiment. For details, refer to the description in the foregoing method embodiment.

In a possible design, the network device 220 may include one or more memories 2201, storing instructions. The instructions may be run on the processor 2202, so that the network device 220 performs the method that is described in the foregoing method embodiment and that is implemented by the network device. Optionally, the memory 2201 may further store data. Optionally, the processor 2202 may also store instructions and/or data. For example, the one or more memories 2201 may store the capability information described in the foregoing embodiment, or the configuration information in the foregoing embodiment. The processor 2202 and the memory 2201 may be disposed separately, or may be integrated together.

In still another possible design, the network device 220 may further include a transceiver unit 2203 and an antenna, or include a communication interface. The transceiver unit 2203 may be referred to as a transceiver, a transceiver circuit, a transceiver machine, or the like, and is configured to implement a transceiver function of the apparatus by using an antenna. The communication interface (not shown in the figure) may be used for communication between a terminal device and the network device, or communication between network devices. Optionally, the communication interface may be a wired communication interface, for example, a fiber communication interface.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above.

In the several embodiments provided in this application, it can be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The storage medium includes various media that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method, comprising:
receiving, by a terminal device, a first bandwidth part (BWP) hopping pattern from a network device, wherein the first BWP hopping pattern comprises one or more pieces of first configuration information configured to be used for switching between a first BWP and a second BWP;
receiving, by the terminal device, a second BWP hopping pattern from the network device, wherein the second BWP hopping pattern comprises one or more pieces of second configuration information configured to be used for switching between the first BWP and a third BWP;
triggering the first BWP hopping pattern, wherein triggering the first BWP hopping pattern comprises switching, by the terminal device, between the first BWP and the second BWP based on the first BWP hopping pattern, wherein the switching between the first BWP and the second BWP comprises switching from the first BWP to the second BWP and switching from the second BWP to the first BWP; and
when the first BWP hopping pattern and the second BWP hopping pattern do not conflict in time domain, simultaneously triggering, by the terminal device, the second BWP hopping pattern with the first BWP hopping pattern, wherein triggering the second BWP hopping pattern comprises switching, by the terminal device, between the first BWP and the third BWP based on the second BWP hopping pattern.

2. The method according to claim 1, wherein switching between the first BWP and the second BWP comprises periodically switching between the first BWP and the second BWP.

3. The method according to claim 1, wherein switching between the first BWP and the second BWP based on the first BWP hopping pattern comprises:
determining a first time domain resource and a second time domain resource in a switching period based on the first BWP hopping pattern;
switching from the first BWP to the second BWP on the first time domain resource; and
switching from the second BWP to the first BWP on the second time domain resource.

4. The method according to claim 3, wherein the first configuration information comprises at least one of the following: an identifier of the first BWP, an identifier of the second BWP, indication information of the switching period, or indication information of a third time domain resource in the switching period, wherein the third time domain resource is a time domain resource of the second BWP.

5. The method according to claim 4, wherein an end moment of the first time domain resource is a start moment of the third time domain resource, and a start moment of the second time domain resource is an end moment of the third time domain resource.

6. The method according to claim 5, wherein:
a length of the first time domain resource and a length of the second time domain resource are equal to a switch delay of switching between the first BWP and the second BWP; and
wherein:
the switch delay is predefined in the terminal device; or
the first configuration information further comprises indication information of the switch delay.

7. The method according to claim 6, further comprising:
sending, by the terminal device, a switch delay supported by the terminal device to the network device, wherein the switch delay indicated by the first configuration information is greater than or equal to the switch delay supported by the terminal device.

8. The method according to claim 1, further comprising:
performing, by the terminal device, radio resource management (RRM) or radio link monitoring (RLM) on the second BWP; or
receiving a broadcast message or a paging message on the second BWP.

9. The method according to claim 8, wherein a switching period is greater than or equal to a transmission period of a reference signal for RRM, a broadcast message, or a paging message.

10. The method according to claim 9, further comprising:
sending, by the terminal device to the network device, a synchronization signal block (SSB) receiving period supported by the terminal device, a system information block (SIB) receiving period supported by the terminal device, or a paging message receiving period supported by the terminal device; and
wherein the switching period is less than or equal to the SSB receiving period supported by the terminal device, the SIB receiving period supported by the terminal device, or the paging message receiving period supported by the terminal device.

11. A terminal device, comprising:
a transceiver, configured to receive a first bandwidth part (BWP) hopping pattern and a second BWP hopping pattern from a network device, wherein the first BWP hopping pattern comprises one or more pieces of first configuration information configured to be used for switching between a first BWP and a second BWP, wherein the second BWP hopping pattern comprises one or more pieces of second configuration information configured to be used for switching between the first BWP and a third BWP; and
a processor, configured to:
trigger the first BWP hopping pattern, wherein triggering the first BWP hopping pattern comprises switching between the first BWP and the second BWP based on the first BWP hopping pattern, wherein the switching between the first BWP and the second BWP comprises switching from the first BWP to the second BWP and switching from the second BWP to the first BWP; and
when the first BWP hopping pattern and the second BWP hopping pattern do not conflict in time domain, simultaneously triggering, by the terminal device, the second BWP hopping pattern with the first BWP hopping pattern, wherein triggering the second BWP hopping pattern comprises switching, by the terminal device, between the first BWP and the third BWP based on the second BWP hopping pattern.

12. The terminal device according to claim 11, wherein switching between the first BWP and the second BWP comprises periodically switching between the first BWP and the second BWP.

13. The terminal device according to claim 11, wherein the processor is configured to:
determine a first time domain resource and a second time domain resource in a switching period based on the first BWP hopping pattern;
switch from the first BWP to the second BWP on the first time domain resource; and
switch from the second BWP to the first BWP on the second time domain resource.

14. The terminal device according to claim 13, wherein the first configuration information comprises at least one of the following: an identifier of the first BWP, an identifier of the second BWP, indication information of the switching period, and indication information of a third time domain resource in the switching period, wherein the third time domain resource is a time domain resource of the second BWP.

15. The terminal device according to claim 14, wherein an end moment of the first time domain resource is a start moment of the third time domain resource, and a start moment of the second time domain resource is an end moment of the third time domain resource.

16. The terminal device according to claim 15, wherein a length of the first time domain resource and a length of the second time domain resource are equal to a switch delay of switching between the first BWP and the second BWP; and
wherein:
the switch delay is predefined in the terminal device; or
the first configuration information further comprises indication information of the switch delay.

17. The terminal device according to claim 16, wherein the transceiver is configured to send a switch delay supported by the terminal device to the network device, wherein the switch delay indicated by the first configuration information is greater than or equal to the switch delay supported by the terminal device.

18. The terminal device according to claim 17, wherein the transceiver is further configured to:
perform radio resource management (RRM) or radio link monitoring (RLM) on the second BWP; or
receive a broadcast message or a paging message on the second BWP.

19. The terminal device according to claim 18, wherein the switching period is greater than or equal to a transmission period of a reference signal for RRM, a broadcast message, or a paging message.

20. The terminal device according to claim 19, wherein the transceiver is further configured to:
send, to the network device, a synchronization signal block (SSB) receiving period supported by the terminal device, a system information block (SIB) receiving period supported by the terminal device, or a paging message receiving period supported by the terminal device, wherein the switching period is less than or equal to the SSB receiving period supported by the terminal device, the SIB receiving period supported by the terminal device, or the paging message receiving period supported by the terminal device.

* * * * *